US010668368B2

(12) United States Patent
Mallinson

(10) Patent No.: US 10,668,368 B2
(45) Date of Patent: Jun. 2, 2020

(54) ACTIVE RETROREFLECTORS FOR HEAD-MOUNTED DISPLAY TRACKING

(71) Applicant: Sony Interactive Entertainment Inc., Tokyo (JP)

(72) Inventor: Dominic Mallinson, Redwood City, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 179 days.

(21) Appl. No.: 15/784,011

(22) Filed: Oct. 13, 2017

(65) Prior Publication Data

US 2018/0361232 A1 Dec. 20, 2018

Related U.S. Application Data

(63) Continuation-in-part of application No. 15/665,180, filed on Jul. 31, 2017.
(Continued)

(51) Int. Cl.
*A63F 13/213* (2014.01)
*G01S 17/89* (2020.01)
(Continued)

(52) U.S. Cl.
CPC ............ *A63F 13/213* (2014.09); *A63F 13/25* (2014.09); *A63F 13/428* (2014.09); *A63F 13/52* (2014.09);
(Continued)

(58) Field of Classification Search
CPC ............ G02B 27/0172; G02B 26/0833; G02B 26/127; G02B 27/2271; A63F 13/212;
(Continued)

(56) References Cited

U.S. PATENT DOCUMENTS

| 6,097,353 A * | 8/2000 | Melville ................ G02B 27/01 345/8 |
| 2012/0168605 A1* | 7/2012 | Milanovic ............ G01B 11/002 250/203.1 |

(Continued)

OTHER PUBLICATIONS

Foxlin, Eric and Welch, Greg: "Motion Tracking: No Silver Bullet, but a Respectable Arsenal," IEEE Computer Graphics and Applications, IEEE Service Center, New York, NY, US; vol. 22, No. 6, Nov. 1, 2002 (Nov. 1, 2002), pp. 24-38, XP011095117, ISSN: 0272-1716, the whole document.

(Continued)

*Primary Examiner* — James R Greece
(74) *Attorney, Agent, or Firm* — Penilla IP, APC

(57) ABSTRACT

A head-mounted display (HMD) is provided, including: an emitter configured to emit a scanning beam into an interactive environment, the scanning beam being configured to continuously trace a predefined scan pattern; a detector configured to detect reflections of the scanning beam back to the HMD by each of a plurality of modulating retroreflectors; a processor configured to, for each detected reflection of the scanning beam, analyze the detected reflection to identify the modulating retroreflector that produced the reflection, and further determine a time at which the reflection occurred, wherein the times at which the reflections occurred and the identification of the modulating retroreflectors that produced the reflections are used to determine a location or orientation of the HMD in the interactive environment; a display device configured to render a view of a virtual space that is determined based on the determined location or orientation of the HMD.

20 Claims, 23 Drawing Sheets

Related U.S. Application Data

(60) Provisional application No. 62/519,716, filed on Jun. 14, 2017.

(51) Int. Cl.

| | |
|---|---|
| *A63F 13/52* | (2014.01) |
| *G06F 3/01* | (2006.01) |
| *A63F 13/25* | (2014.01) |
| *G01S 17/42* | (2006.01) |
| *A63F 13/428* | (2014.01) |
| *G06F 3/0346* | (2013.01) |
| *G02B 27/01* | (2006.01) |
| *A63F 13/98* | (2014.01) |
| *G02B 26/10* | (2006.01) |
| *G01S 17/74* | (2006.01) |
| *G02B 26/08* | (2006.01) |

(52) U.S. Cl.
CPC .............. *A63F 13/98* (2014.09); *G01S 17/42* (2013.01); *G01S 17/74* (2013.01); *G01S 17/89* (2013.01); *G02B 26/0833* (2013.01); *G02B 26/101* (2013.01); *G02B 27/0172* (2013.01); *G06F 3/011* (2013.01); *G06F 3/012* (2013.01); *G06F 3/0346* (2013.01)

(58) Field of Classification Search
CPC .... A63F 13/213; A63F 13/24; A63F 13/5255; G01S 17/42; G01S 17/66; G06F 3/012
USPC ........................................................ 359/630
See application file for complete search history.

(56) References Cited

U.S. PATENT DOCUMENTS

2014/0276000 A1  9/2014  Mullaney et al.
2015/0176972 A1  6/2015  Tait et al.

OTHER PUBLICATIONS

Form PCT/ISA/206 (Invitation to Pay Additional Fees and, Where Applicable, Protest Fee) with attached EPO Form 1707-04-17 (Provisional Opinion Accompanying the Partial Search Result), dated Sep. 17, 2018 (Sep. 17, 2018), issued in corresponding International Patent Application No. PCT/US2018/037501 (10 total pages).

* cited by examiner

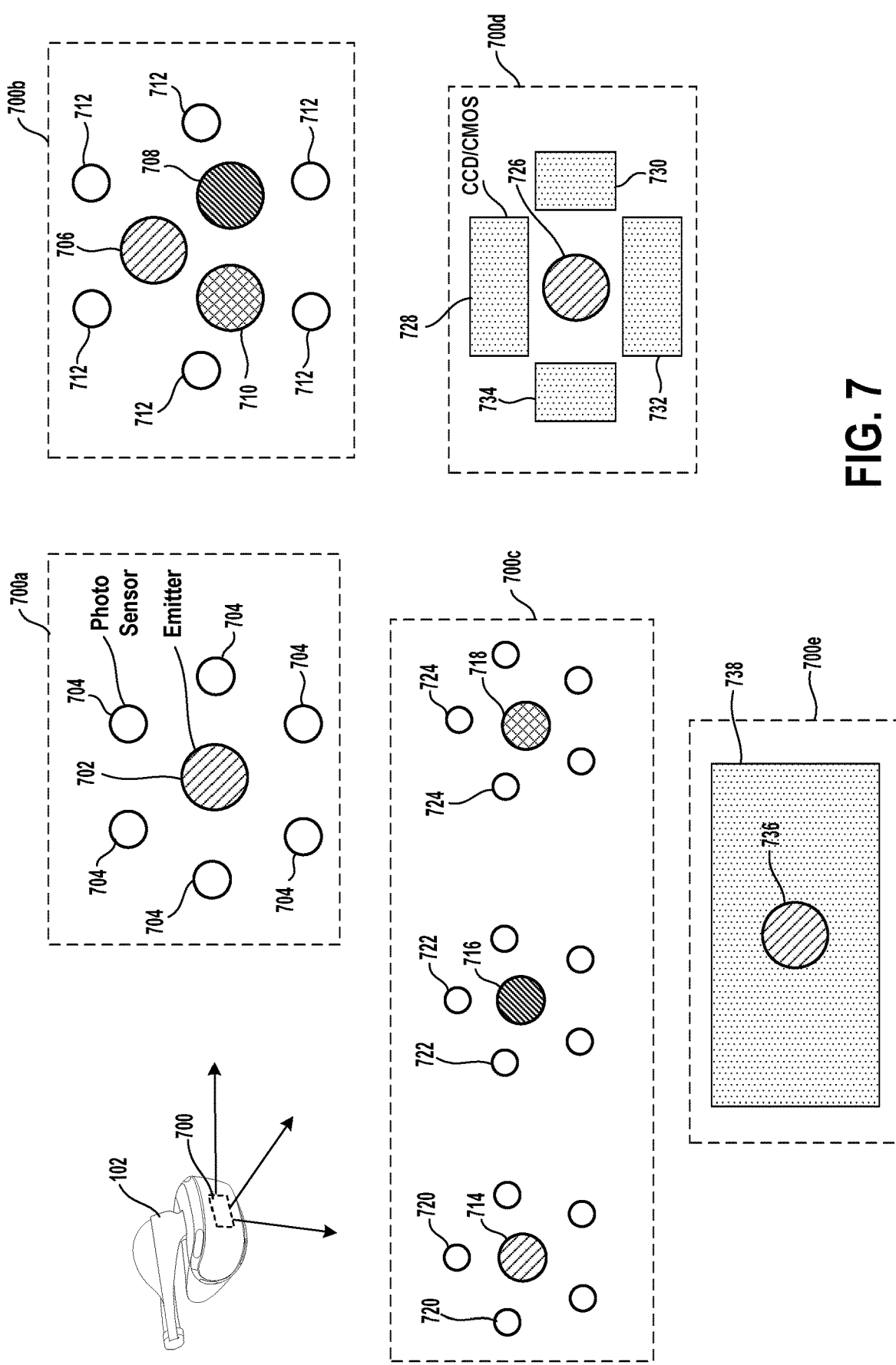

ACTIVE RETROREFLECTORS FOR HEAD-MOUNTED DISPLAY TRACKING

CLAIM OF PRIORITY

This application claims priority as a continuation-in-part of U.S. patent application Ser. No. 15/665,180, filed Jul. 31, 2017, entitled "HEAD-MOUNTED DISPLAY TRACKING USING CORNER REFLECTORS," which claims priority to U.S. Provisional Patent Application No. 62/519,716, filed Jun. 14, 2017, entitled "HEAD-MOUNTED DISPLAY TRACKING USING CORNER REFLECTORS," the disclosure of which is herein incorporated by reference.

BACKGROUND

1. Field of the Disclosure

The present disclosure relates to tracking of a head-mounted display (HMD) using active retroreflectors, and related methods, apparatus, and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

A head-mounted display (HMD) provides an immersive virtual reality experience, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD. The processing resources required to generate high quality video (e.g. at high resolution and frame rate) for rendering on the HMD are considerable and therefore typically handled by a separate computing device, such as a personal computer or a game console. The computing device generates the video for rendering to the HMD, and transmits the video to the HMD.

To provide a realistic viewing experience on an HMD, it is imperative to track the location and orientation of the HMD in the interactive environment with high levels of precision and responsiveness, so that the appropriate view of the virtual environment can be generated to for rendering through the HMD to provide a real-time viewing experience. To facilitate tracking of the HMD, current state-of-the-art HMD systems typically employ additional wired peripherals, such as emitters or sensors stationed at various locations in the local environment. These emitters or sensors must be connected to the central computing device by lengthy wires or cables that can be unsightly and difficult to manage. Coupled with the fact that additional cables are typically necessary for the HMD device itself, and such setups are cumbersome in terms of placement and connection of all of the different devices. The complexity of such setups further poses a barrier to the adoption and continued use of HMD systems.

It is in this context that implementations of the disclosure arise.

SUMMARY

Implementations of the present disclosure include devices, methods and systems relating to using corner reflectors for tracking a head-mounted display (HMD).

In some implementations, a head-mounted display (HMD) is provided, including the following: an emitter configured to emit a scanning beam into an interactive environment in which the HMD is disposed, the scanning beam being configured to continuously trace a predefined scan pattern; a detector configured to detect reflections of the scanning beam back to the HMD by each of a plurality of reflectors; a processor configured to, for each reflector, determine a time at which the reflection of the scanning beam by the reflector occurred, wherein the time is used to determine a location or orientation of the HMD in the interactive environment; a display device configured to render a view of a virtual space that is determined based on the determined location or orientation of the HMD.

In some implementations, the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

In some implementations, the predefined scan pattern is defined by a raster scan pattern or a Lissajous scan pattern.

In some implementations, the scanning beam is defined by an infrared (IR) beam that is generated by the beam generator.

In some implementations, each of the plurality of reflectors is configured to reflect the scanning beam back to the HMD along a return path that is substantially parallel and substantially coincident to an emission path along which the scanning beam was emitted from the emitter.

In some implementations, each of the plurality of reflectors is defined by a corner reflector.

In some implementations, the detector includes at least one photosensor configured to detect the reflections of the scanning beam.

In some implementations, the plurality of reflectors includes three or more reflectors.

In some implementations, determining the location or orientation of the HMD includes, for each reflector, determining a position of the scanning beam at the time that the reflection of the scanning beam from the reflector occurred.

In some implementations, a system is provided, including the following: a plurality of reflectors; a head-mounted display (HMD), including, an emitter configured to emit a scanning beam into an interactive environment in which the HMD is disposed, the scanning beam being configured to continuously trace a predefined scan pattern; a detector configured to detect reflections of the scanning beam back to the HMD by each of a plurality of reflectors; a processor configured to, for each reflector, determine a time at which the reflection of the scanning beam by the reflector occurred, wherein the time is used to determine a location or orientation of the HMD in the interactive environment; a display device; a computing device, the computing device configured to generate a view of a virtual space that is determined based on the determined location or orientation of the HMD in the interactive environment; wherein the display device of the HMD is configured to render the view of the virtual space.

In some implementations, the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

In some implementations, each of the plurality of reflectors is configured to reflect the scanning beam back to the HMD along a return path that is substantially parallel and substantially coincident to an emission path along which the scanning beam was emitted from the emitter.

In some implementations, each of the plurality of reflectors is defined by a corner reflector.

In some implementations, the detector includes at least one photosensor configured to detect the reflections of the scanning beam.

In some implementations, the plurality of reflectors includes three or more reflectors.

In some implementations, determining the location or orientation of the HMD includes, for each reflector, determining a position of the scanning beam at the time that the reflection of the scanning beam from the reflector occurred.

In some implementations, a method is provided, including the following operations: emitting, from a head-mounted display (HMD), a scanning beam into an interactive environment in which the HMD is disposed, the scanning beam being configured to continuously trace a predefined scan pattern; detecting, at the HMD, reflections of the scanning beam back to the HMD by each of a plurality of reflectors; for each reflector, determining a time at which the reflection of the scanning beam by the reflector occurred, wherein the time is used to determine a location or orientation of the HMD in the interactive environment; rendering through the HMD a view of a virtual space that is determined based on the determined location or orientation of the HMD.

In some implementations, the predefined scan pattern is defined by a raster scan pattern or a Lissajous scan pattern.

In some implementations, each of the plurality of reflectors is configured to reflect the scanning beam back to the HMD along a return path that is substantially parallel and substantially coincident to an emission path along which the scanning beam was emitted from the HMD.

In some implementations, each of the plurality of reflectors is defined by a corner reflector.

In some implementations, a head-mounted display (HMD) is provided, including: an emitter configured to emit a scanning beam into an interactive environment in which the HMD is disposed, the scanning beam being configured to continuously trace a predefined scan pattern; a detector configured to detect reflections of the scanning beam back to the HMD by each of a plurality of modulating retroreflectors; a processor configured to, for each detected reflection of the scanning beam, analyze the detected reflection of the scanning beam to identify the modulating retroreflector that produced the reflection of the scanning beam, and further determine a time at which the reflection of the scanning beam by the identified modulating retroreflector occurred, wherein the times at which the reflections occurred and the identification of the modulating retroreflectors that produced the reflections are used to determine a location or orientation of the HMD in the interactive environment; a display device configured to render a view of a virtual space that is determined based on the determined location or orientation of the HMD.

In some implementations, analyzing the detected reflection of the scanning beam includes identifying an encoding of the reflection of the scanning beam that is produced by, and correlated to, the modulating retroreflector that produced the reflection.

In some implementations, the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

In some implementations, the predefined scan pattern is defined by a raster scan pattern or a Lissajous scan pattern.

In some implementations, the scanning beam is defined by an infrared (IR) beam that is generated by the beam generator.

In some implementations, each of the plurality of modulating retroreflectors is configured to reflect the scanning beam back to the HMD along a return path that is substantially parallel and substantially coincident to an emission path along which the scanning beam was emitted from the emitter.

In some implementations, each of the plurality of modulating retroreflectors includes a corner reflector.

In some implementations, the detector includes at least one photosensor configured to detect the reflections of the scanning beam.

In some implementations, the plurality of modulating retroreflectors includes three or more modulating retroreflectors.

In some implementations, determining the location or orientation of the HMD includes, for each modulating retroreflector, determining a position of the scanning beam at the time that the reflection of the scanning beam from the modulating retroreflector occurred.

In some implementations, a system is provided, including: a plurality of modulating retroreflectors; a head-mounted display (HMD), including, an emitter configured to emit a scanning beam into an interactive environment in which the HMD is disposed, the scanning beam being configured to continuously trace a predefined scan pattern; a detector configured to detect reflections of the scanning beam back to the HMD by each of a plurality of modulating retroreflectors; a processor configured to, for each detected reflection of the scanning beam, analyze the detected reflection of the scanning beam to identify the modulating retroreflector that produced the reflection of the scanning beam, and further determine a time at which the reflection of the scanning beam by the identified modulating retroreflector occurred, wherein the times at which the reflections occurred and the identification of the modulating retroreflectors that produced the reflections are used to determine a location or orientation of the HMD in the interactive environment; a display device; a computing device, the computing device configured to generate a view of a virtual space that is determined based on the determined location or orientation of the HMD in the interactive environment; wherein the display device of the HMD is configured to render the view of the virtual space.

In some implementations, analyzing the detected reflection of the scanning beam includes identifying an encoding of the reflection of the scanning beam that is produced by, and correlated to, the modulating retroreflector that produced the reflection.

In some implementations, the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

In some implementations, each of the plurality of modulating retroreflectors is configured to reflect the scanning beam back to the HMD along a return path that is substantially parallel and substantially coincident to an emission path along which the scanning beam was emitted from the emitter.

In some implementations, each of the plurality of modulating retroreflectors includes a corner reflector.

In some implementations, the detector includes at least one photosensor configured to detect the reflections of the scanning beam.

In some implementations, the plurality of modulating retroreflectors includes three or more modulating retroreflectors.

In some implementations, determining the location or orientation of the HMD includes, for each modulating retroreflector, determining a position of the scanning beam at the time that the reflection of the scanning beam from the modulating retroreflector occurred.

In some implementations, a method is provided, including: emitting, from a head-mounted display (HMD), a scanning beam into an interactive environment in which the HMD is disposed, the scanning beam being configured to continuously trace a predefined scan pattern; detecting, at the HMD, reflections of the scanning beam back to the HMD by each of a plurality of modulating retroreflectors; for each detected reflection of the scanning beam, analyzing the detected reflection of the scanning beam to identify the modulating retroreflector that produced the reflection of the scanning beam, and further determining a time at which the reflection of the scanning beam by the identified modulating retroreflector occurred, wherein the times at which the reflections occurred and the identification of the modulating retroreflectors that produced the reflections are used to determine a location or orientation of the HMD in the interactive environment; rendering through the HMD a view of a virtual space that is determined based on the determined location or orientation of the HMD.

In some implementations, analyzing the detected reflection of the scanning beam includes identifying an encoding of the reflection of the scanning beam that is produced by, and correlated to, the modulating retroreflector that produced the reflection.

In some implementations, the predefined scan pattern is defined by a raster scan pattern or a Lissajous scan pattern.

In some implementations, each of the plurality of modulating retroreflectors is configured to reflect the scanning beam back to the HMD along a return path that is substantially parallel and substantially coincident to an emission path along which the scanning beam was emitted from the HMD.

In some implementations, each of the plurality of modulating retroreflectors includes a corner reflector.

In some implementations, a system is provided, including: a head-mounted display (HMD), including, a plurality of retroreflectors, and a display device; an emitter/detector unit, including, an emitter configured to emit a scanning beam into an interactive environment in which the HMD is disposed, the scanning beam being configured to continuously trace a predefined scan pattern, and a detector configured to detect reflections of the scanning beam back to the HMD by each of the plurality of retroreflectors; a computing device, including, a processor configured to, for each retroreflector, determine a time at which the reflection of the scanning beam by the retroreflector occurred, wherein the time is used to determine a location or orientation of the HMD in the interactive environment, the computing device configured to generate a view of a virtual space that is determined based on the determined location or orientation of the HMD in the interactive environment; wherein the display device of the HMD is configured to render the view of the virtual space.

In some implementations, the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

In some implementations, the predefined scan pattern is defined by a raster scan pattern or a Lissajous scan pattern.

In some implementations, the scanning beam is defined by an infrared (IR) beam that is generated by the beam generator.

In some implementations, each of the plurality of retroreflectors is configured to reflect the scanning beam back to the HMD along a return path that is substantially parallel and substantially coincident to an emission path along which the scanning beam was emitted from the emitter.

In some implementations, each of the plurality of retroreflectors is defined by a corner retroreflector.

In some implementations, the detector includes at least one photosensor configured to detect the reflections of the scanning beam.

In some implementations, the plurality of retroreflectors includes three or more retroreflectors.

In some implementations, determining the location or orientation of the HMD includes, for each retroreflector, determining a position of the scanning beam at the time that the reflection of the scanning beam from the retroreflector occurred.

In some implementations, each of the retroreflectors is a modulating retroreflector configured to modulate a reflection of the scanning beam produced by the modulating retroreflector, to enable identification of the modulating retroreflector from the reflected scanning beam.

In some implementations, a method is provided, including: emitting a scanning beam into an interactive environment in which a head-mounted display (HMD) is disposed, the scanning beam being configured to continuously trace a predefined scan pattern; detecting reflections of the scanning beam reflected back by each of a plurality of retroreflectors of the HMD; for each retroreflector, determining a time at which the reflection of the scanning beam by the retroreflector occurred, wherein the time is used to determine a location or orientation of the HMD in the interactive environment; rendering through the HMD a view of a virtual space that is determined based on the determined location or orientation of the HMD.

In some implementations, emitting the scanning beam includes activating a beam generator to generate and direct the scanning beam towards a microelectromechanical system (MEMS) mirror, and controlling the MEMS mirror to steer the scanning beam to continuously trace the predefined scan pattern.

In some implementations, the predefined scan pattern is defined by a raster scan pattern or a Lissajous scan pattern.

In some implementations, the scanning beam is defined by an infrared (IR) beam that is generated by the beam generator.

In some implementations, each of the plurality of retroreflectors is configured to reflect the scanning beam back along a return path that is substantially parallel and substantially coincident to an emission path along which the scanning beam was emitted.

In some implementations, each of the plurality of retroreflectors is defined by a corner retroreflector.

In some implementations, detecting the reflections of the scanning beam is performed by at least one photosensor.

In some implementations, the plurality of retroreflectors includes three or more retroreflectors.

In some implementations, determining the location or orientation of the HMD includes, for each retroreflector, determining a position of the scanning beam at the time that the reflection of the scanning beam from the retroreflector occurred.

In some implementations, each of the retroreflectors is a modulating retroreflector configured to modulate a reflection of the scanning beam produced by the modulating retroreflector, to enable identification of the modulating retroreflector from the reflected scanning beam.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 7 illustrates various arrangements of emitters and detectors for an HMD, in accordance with implementations of the disclosure.

FIGS. 15A-1 and 15A-2 illustrate a head-mounted display (HMD), in accordance with an embodiment of the disclosure.

DETAILED DESCRIPTION

Figure 1:
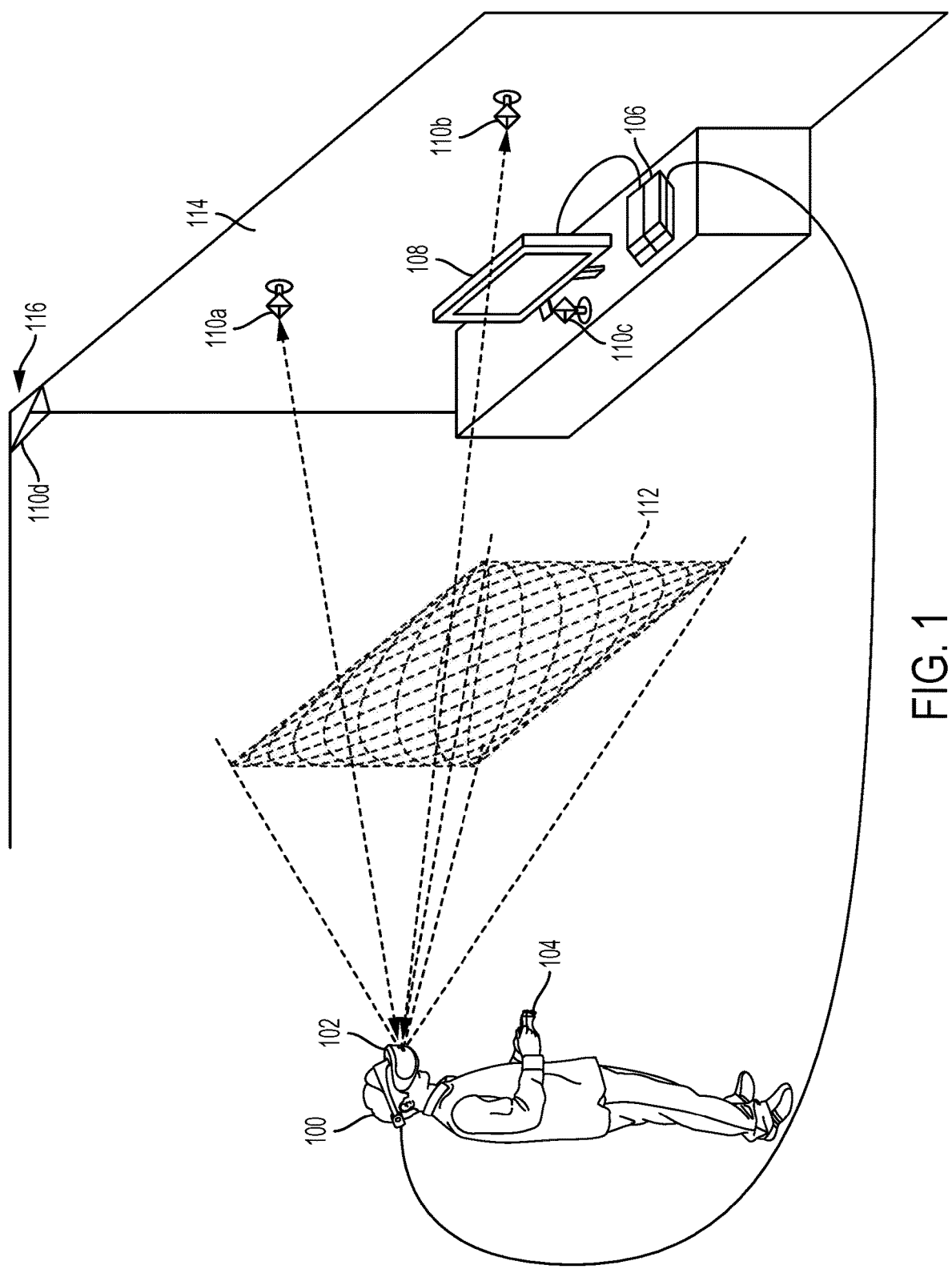
FIG. 1 illustrates a system for interaction with a virtual environment via a head-mounted display (HMD), in accordance with an embodiment of the disclosure.

The following implementations of the present disclosure provide devices, methods, and systems relating to tracking of a head mounted display (HMD) using corner reflectors. It will be obvious, however, to one skilled in the art, that the present disclosure may be practiced without some or all of the specific details presently described. In other instances, well known process operations have not been described in detail in order not to unnecessarily obscure the present disclosure.

Broadly speaking, implementations of the present disclosure provide systems and methods employing a plurality of corner reflectors for tracking of an HMD in an interactive environment. The HMD is configured to have at least one emitter that emits a scanning beam that traces a predefined scan pattern. For example, the predefined scan pattern can be a raster scan pattern or a Lissajous scan pattern. The emitter hardware can include a beam generator that generates the beam and directs it towards a microelectromechanical system (MEMS) mirror. The MEMS mirror is controlled to reflect the beam and steer it so as to trace the predefined scan pattern. Additional details regarding emission of a scanning beam and detection by a detector can be found, by way of example, with reference to U.S. application Ser. No. 15/199,936, filed Jun. 30, 2016, entitled "SYSTEMS AND METHODS FOR USING A MEMS PROJECTOR TO DETERMINE AN ORIENTATION OF A PHOTOSENSOR OF AN HMD OR ANOTHER CONTROLLER," the disclosure of which is incorporated by reference herein.

A plurality of corner reflectors are stationed at different locations in the interactive environment. For example, the corner reflectors can be mounted against one or more walls of a room (including against adjoining walls or in the corners of a room), situated on furniture or other supportive structures such as a media cabinet, mantle, bookshelf, speakers, etc. or otherwise positioned in a stationary location and configured to reflect the scanning beam back towards the HMD. Corner reflectors are configured to reflect a beam back towards its source along a path that is substantially parallel and coincident to the path of the incoming beam.

The HMD includes sensors capable of detecting the reflected beam from a corner reflector when the scanning beam hits the corner reflector. Based on the time of detection of the reflected scanning beam, the position or direction of the scanning beam can be determined. Using this information across each of the reflectors, and knowing the locations of the corner reflectors in the interactive environment and/or relative to each other (e.g. knowing the relative three-dimensional positions of the corner reflectors, the distances between each of the corner reflectors, etc.), it is then possible to determine the location and/or orientation of the HMD in the interactive environment and/or relative to the corner reflectors (e.g. using a technique such as the Perspective n-point algorithm).

In various implementations, the methods, systems, image capture objects, sensors and associated interface objects (e.g., gloves, controllers, peripheral devices, etc.) are configured to process data that is configured to be rendered in substantial real-time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

FIG. 1 illustrates a system for interaction with a virtual environment via a head-mounted display (HMD), in accordance with an embodiment of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a view of the virtual space when facing in a given direction, and when the user turns to a side and thereby turns the HMD likewise, then the view to that side in the virtual space is rendered on the HMD. In the illustrated implementation, a user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In the illustrated implementation, the HMD 102 is connected to a computer 106. In some implementations, the connection is a wired connection; whereas in other implementations, the connection may be wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

In some implementations, the HMD 102 may also communicate with the computer through alternative mechanisms or channels, such as via a network to which both the HMD 102 and the computer 106 are connected.

In order to provide a high quality VR experience, it is important to track the HMD 102, including tracking its location and orientation in the local interactive environment, with high levels of precision and frequency, so that the view of the VR space provided through the HMD can be updated in real-time. To accomplish this, some existing VR systems require deployment of wired and powered peripheral devices, such as various types of emitters or sensors. Multiple ones of these wired and powered peripherals may be required in order to provide accurate three-dimensional (3D) tracking. However, setup of such wired peripherals is cumbersome for the user, and may also limit placement of the computing device to which they must be connected. Furthermore, it is challenging to place such devices at locations such as behind the user, without long runs of wiring or employing complex and expensive wireless technology.

In view of such problems in prior art VR systems, the implementations of the present disclosure utilize a plurality of reflectors which can be easily and discreetly positioned about the local environment, without the requirement of any additional wiring. With continued reference to FIG. 1, a plurality of reflectors 110a, 110b, 110c, and 110d are shown by way of example. The reflectors 110a and 110b are mounted against a wall 114 in front of the user, and the reflector 110c is shown resting on a media cabinet. Reflector 110d is mounted in a corner 116 of the room, with the reflective surfaces of the reflector 110d being substantially aligned with the intersecting wall surfaces of the corner 116. It will be appreciated that though in the illustrated implementation, reflectors are shown specifically in front of the user 100, such reflectors may also be positioned at any other location surrounding the user 100 in the local interactive environment, including to the sides of the user 100, on the floor, behind the user 100, on the ceiling, etc. The reflectors can be configured to rest on any available surface and/or may be affixed or mounted to any surface.

The HMD 102 is configured to emit a scanning beam into the interactive environment. In some implementations, the scanning beam is a beam of electromagnetic (EM) radiation at a frequency in a visible or non-visible spectrum. In some implementations, the beam is an infrared (IR) beam. The scanning beam is emitted from the HMD 102 and repeatedly traces a predefined scan pattern (conceptually shown at reference 112), such as a raster scan pattern or a Lissajous scan pattern.

The reflectors 110 are configured, when struck by the scanning beam, to reflect the scanning beam back to its source, that is, towards the HMD 102. In other words, each reflector is configured to reflect the scanning beam back towards the HMD along a path that is parallel to the path along which the scanning beam traveled from the HMD towards the reflector, and largely coincident so that the reflected scanning beam arrives at the HMD with high locality to the emitter (e.g. within a predefined radius of the scanning beam's source emission point). In some implementations, the reflectors are defined by corner reflectors/mirrors, wherein each reflector includes three planar mirrors that are mutually perpendicular to each other. In some implementations, the reflectors are defined by other types of retroreflectors, such as spherical retroreflectors (e.g. "cat's eye" retroreflectors), or holographic retroreflectors, that are configured to reflect the scanning beam back to the HMD along a substantially parallel and substantially coincident return path as previously discussed.

The scanning beam continually traces a predefined periodically repeating scan pattern, and as a result, at certain points in time, the scanning beam will hit each of the reflectors. When the scanning beam hits a given reflector, the beam will be reflected back to the HMD. The HMD is configured to detect when this occurs, and based on the timing of occurrence, the direction of the beam (relative to the HMD) when it hit the reflector can be determined. A similar process is performed for each reflector, thus providing a direction of the scanning beam to each of the reflectors from the HMD. Using the direction of the scanning beam to each of the reflectors, and using known locations of the reflectors (in the interactive environment or relative to each other), it is then possible to determine the location and orientation of the HMD, in the interactive environment and/or relative to the locations of the reflectors (e.g. using an algorithm such as Perspective n-point).

Using the foregoing system and method, accurate tracking of the location and orientation of the HMD 102 is achieved without the need for additional wired peripheral devices. The reflectors 110 are easily placed at varying locations in the local environment and they do not require power or data connectivity to function. Using the tracked location and orientation of the HMD 102, the computer 106 generates video data for the appropriate view of the virtual space to be rendered on the HMD 102. As noted, this entails responsively rendering the view of the virtual space based on the HMD's movements, so as to provide a realistic sensation to the user of immersion in the virtual space.

It is noted that implementations of the present disclosure provide for identification of which of the plurality of retro-reflectors is being detected by the photo sensor. As a given one of the reflectors may or may not fall within the scope of the scanning beam depending upon the direction the emitter is pointed and which retro-reflectors are in view. Thus, by way of example, a method such as SLAM can be used to map and track the locations of the reflectors and enable recognition of the previously seen topology allowing for the labeling of the reflectors and performance of an effective pattern match.

Furthermore, range finding techniques can be utilized to enable or improve the tracking of the reflectors and/or the HMD. There are several techniques known in the art to determine the range of a reflected laser beam, including by way of example without limitation, time of flight, phase change in a modulated signal, etc. Such a measurement that can be used to help locate the HMD's pose. From a single known emitter/sensor to a single retro-reflector we can directly measure the position relative to the emitter since we know the direction vector and the range. If three or more such known retro-reflector positions are measured, it allows for determining a full pose (position and orientation).

In some implementations, the user 100 may operate an interface object 104 to provide input for the video game. In some implementations, the interface object 104 is also configured to emit a scanning beam that is reflected back to the interface object 104 by the reflectors 110. Using techniques similar to those discussed above with reference to tracking the HMD 102, the location and orientation of the interface object 104 can also be tracked in the interactive environment.

In some implementations, a camera (not shown) can be configured to capture images of the interactive environment in which the user 100 is located. These captured images can be analyzed to determine the location and movements of the user 100, the HMD 102, and the interface object 104, in combination with the techniques discussed above. In various implementations, the interface object 104 includes a light which can be tracked, and/or inertial sensor(s), to enable determination of the interface object's location and orientation.

The way the user interfaces with the virtual reality scene displayed in the HMD 102 can vary, and other interface devices in addition to interface object 104 can be used. In various implementations, the interface object 104 is any of various kinds of single-handed or two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to further aid in determining the location and orientation of the HMD 102. One or more microphones (which may be included with the camera) can be configured to capture sound from the interactive environment. Sound captured by a microphone array may be processed to identify the location of a sound source. Sound from an identified location can be selectively utilized or processed to the exclusion of other sounds not from the identified location. Furthermore, the camera can be defined to include multiple image capture devices (e.g. stereoscopic pair of cameras), an IR camera, a depth camera, and combinations thereof.

In another embodiment, the computer 106 functions as a thin client in communication over a network with a cloud gaming provider. In such an implementation, generally speaking, the cloud gaming provider maintains and executes the video game being played by the user 102. The computer 106 transmits inputs from the HMD 102 and the interface object 104, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the interface object 104.

In some embodiments, the HMD 102 and interface object 104, may themselves be networked devices that connect to the network, for example to communicate with the cloud gaming provider. In some implementations, the computer 106 may be a local network device, such as a router, that does not otherwise perform video game processing, but which facilitates passage of network traffic. The connections to the network by the HMD 102 and interface object 104 may be wired or wireless.

In some implementations, the view through the HMD 102 can be rendered to other display devices, such as a display 108. Such rendering can be useful to provide spectators with a view of what the user 100 is seeing and experiencing through the HMD 102.

Additionally, though embodiments in the present disclosure may be described with reference to a head-mounted display, it will be appreciated that in other embodiments, non-head mounted displays may be substituted, including without limitation, portable device screens (e.g. tablet, smartphone, laptop, etc.) or any other type of display that can be configured to render video and/or provide for display of an interactive scene or virtual environment in accordance with the present embodiments.

Figure 2:
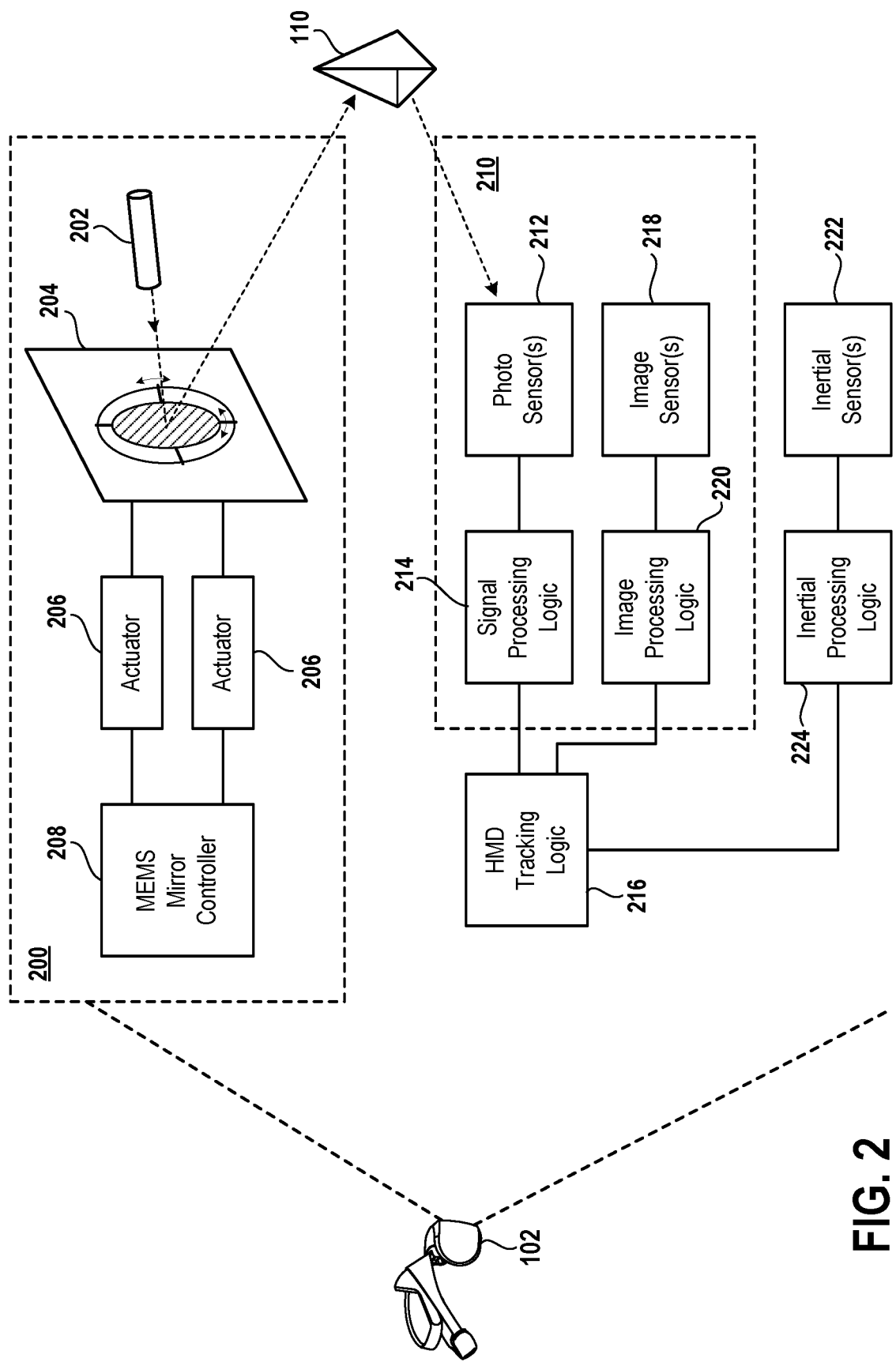
FIG. 2 conceptually illustrates components of an HMD configured to both emit a scanning beam and detect its reflection by a reflector, in accordance with implementations of the disclosure.

FIG. 2 conceptually illustrates components of an HMD configured to both emit a scanning beam and detect its reflection by a reflector, in accordance with implementations of the disclosure. In the illustrated implementation, the HMD 102 includes an emitter 200 that emits the scanning beam from the HMD 102. When the scanning beam hits the reflector 110, it is reflected back towards the HMD 102, and the reflected scanning beam is detected by a detector 210 of the HMD 102.

In some implementations, the emitter 200 is defined by, or includes, a microscanner. The emitter 200 as shown includes a beam generator 202 that generates an electromagnetic beam directed towards a MEMS mirror 204. The electromagnetic beam can be in a visible spectrum or an invisible spectrum. In some implementations, the electromagnetic beam is an infrared (IR) beam. In some implementations, the electromagnetic beam is a laser beam and the beam generator 202 is defined by a laser beam generator. In other implementations, the beam generator 202 can include any kind of electromagnetic source or light source that can be configured to generate the electromagnetic beam directionally towards the MEMS mirror 204, including without limitation, a lamp, LED, etc. The beam generator 202 can include optics, such as one or more lenses and/or mirrors configured to focus or otherwise direct the electromagnetic beam towards the MEMS mirror 204. It will be appreciated that though a single beam generator is described for purposes of explaining an implementation, there can be multiple beam generators in other implementations.

The MEMS mirror 204 reflects the electromagnetic beam generated by the beam generator 202 in a controlled manner so as to scan a region of the local interactive environment, by tracing a predefined scan pattern. That is, the MEMS mirror is controlled to cause the electromagnetic beam to be emitted from the HMD 102 so as to move in a systematically repeated manner that covers a predefined angular region of space relative to the HMD 102. To accomplish this, the MEMS mirror 204 is rotated about a plurality of axes by a plurality of actuators 206. For example, in one implementation, the actuators 206 include a first actuator that rotates the MEMS mirror 204 about a first axis that is coplanar with the reflective surface of the MEMS mirror 204, and a second actuator that rotates the MEMS mirror 204 about a second axis that is also coplanar with the reflective surface of the MEMS mirror 204 and orthogonal to the first axis. In some implementations, the first and second axes can be referred to as the x and y axes of the MEMS mirror 204.

The actuators 206 are controlled by a MEMS mirror controller 208. The MEMS mirror controller 208 can be configured to control the actuators 206 to control the movement of the MEMS mirror 204. For example, a given actuator may be controlled to cause the MEMS mirror 204 to oscillate in a periodic fashion about a corresponding axis. In some implementations, parameters of such an oscillation can be controlled by the MEMS mirror controller 208, such as the angular depth or extent of the oscillation, the frequency of oscillation, the angular velocity and the angular acceleration. In some implementations, the MEMS mirror controller 208 controls the actuators 206 to cause the periodic oscillation of the MEMS mirror 204 about its x and y axes, resulting in controlled reflection of the EM beam so as to trace a Lissajous scan pattern. In other implementations, the MEMS mirror controller 208 controls the actuators 206 to cause the MEMS mirror 204 to reflect the EM beam to produce a raster scan pattern.

As has been noted, the scanning beam emitted from the HMD 102 is reflected back to the HMD when it strikes a reflector 110. The reflected scanning beam from the reflectors 110 is detected by a detector 210 of the HMD 102. The detector 210 includes appropriate sensor hardware to detect the reflected beam. For example, in some implementations, the detector 210 includes one or more photosensors/photodetectors 212 that are capable of detecting the reflected scanning beam. Examples of photosensors 212 include photodiodes, phototransistors, photoresistors, etc. Such photosensors/photodectors should be configured to detect the appropriate frequency or frequencies of the scanning beam. An output signal is generated from each photosensor, and processed by signal processing logic 214 to enable determination of when the scanning beam was reflected from the reflectors 110. For example, the signal may be filtered or processed to exclude or otherwise minimize the effect of signals detected from stray or incident reflections, background or baseline levels, etc. In some implementations, the signal is filtered to eliminate detection levels below a predefined threshold, since the directly reflected beam will have a much higher intensity than unwanted signals. The signal processing logic 214 can also identify when the scanning beam was reflected by the reflector 110, such as by identifying peaks in the signal from the photo sensor 212.

Furthermore, the beam can also be modulated in various ways to improve detection and remove unwanted signal noise. One example is to use optical notch filters to pass through only the specific frequency of the emitted light. Another is to modulate a carrier frequency which can be matched on detection. Yet another is to use a modulated code that can further improve rejection of unwanted signals.

HMD tracking logic 216 determines and tracks the location and/or orientation of the HMD in the local environment using the identified times at which the scanning beam is determined to have been reflected from the reflectors 110. For example, the direction of the emitted scanning beam relative to the HMD (e.g. expressed as angular values or coordinates) at the time the beam hit a given reflector is known. This can be similarly determined for each of the reflectors. Based on the directions of the emitted scanning beam when hit and reflected by each of the reflectors, the HMD tracking logic 216 determines the location and/or orientation of the HMD relative to the reflectors 110 and/or the local interactive environment.

In the illustrated implementation, HMD tracking logic 216 is provided as part of the HMD 102. However, in other implementations the HMD tracking logic 216 can be defined at the computer 106.

In the above-described implementation, photosensors 212 have been described. However, in other implementations, one or more image sensors 218 can be used in place of, or in addition to, the above-described photosensors 212. Examples of image sensors include charge-coupled device (CCD) image sensors, complementary metal oxide semiconductor (CMOS) sensors, etc. Such image sensors 218 can be configured to specifically detect the reflected scanning beam, possibly employing filters or signal modulation and encoding methods to reduce the detection of other forms of EM radiation. The captured image data from the image sensor 218 is analyzed by image processing logic 220 to determine when the scanning beam was reflected from the reflectors 110. As previously noted, the HMD tracking logic 216 uses this information to determine the location and/or orientation of the HMD 102.

In some implementations, the image sensors 218 and image processing logic 220 are provided in addition to the photosensors 212 and signal processing logic 214. In such implementations, the image sensors 218 can be used in a complementary manner to the photosensors 212, with both sensor technologies employed to provide for robust determination of when the scanning beam was reflected. In some implementations, the photosensors 212 are used to detect the scanning beam, whereas the image sensors 218 are used to capture an image stream of the local environment that is analyzed by the image processing logic 220 to identify and track objects in the local environment. For example, a simultaneous localization and mapping (SLAM) technique can be applied. The information from both sensor types is thus used to determine the location and orientation of the HMD 102. In some implementations, the photosensors 212 are used in a primary tracking role to determine the location/orientation of the HMD 102, whereas the image sensors 218, whose processing may be performed at a lower frame rate than that of the photosensors, are used to verify the tracking of the HMD based on the photosensors 212.

In some implementations, the HMD 102 includes one or more inertial/motion/orientation sensors 222. Examples of such sensors include accelerometers, gyroscopes, magnetometers, etc. The signals from the inertial sensors 222 are processed by an inertial processing logic 224. In some implementations, the inertial processing logic 224 is configured to analyze the signals from the inertial sensors 222 to identify movements of the HMD. In some implementations, the HMD tracking logic 216 uses the movements identified from the inertial sensors 222 in combination with data processed from the photosensors 212 and/or the image sensors 218 to determine the location and/or orientation of the HMD 102.

Figure 3:
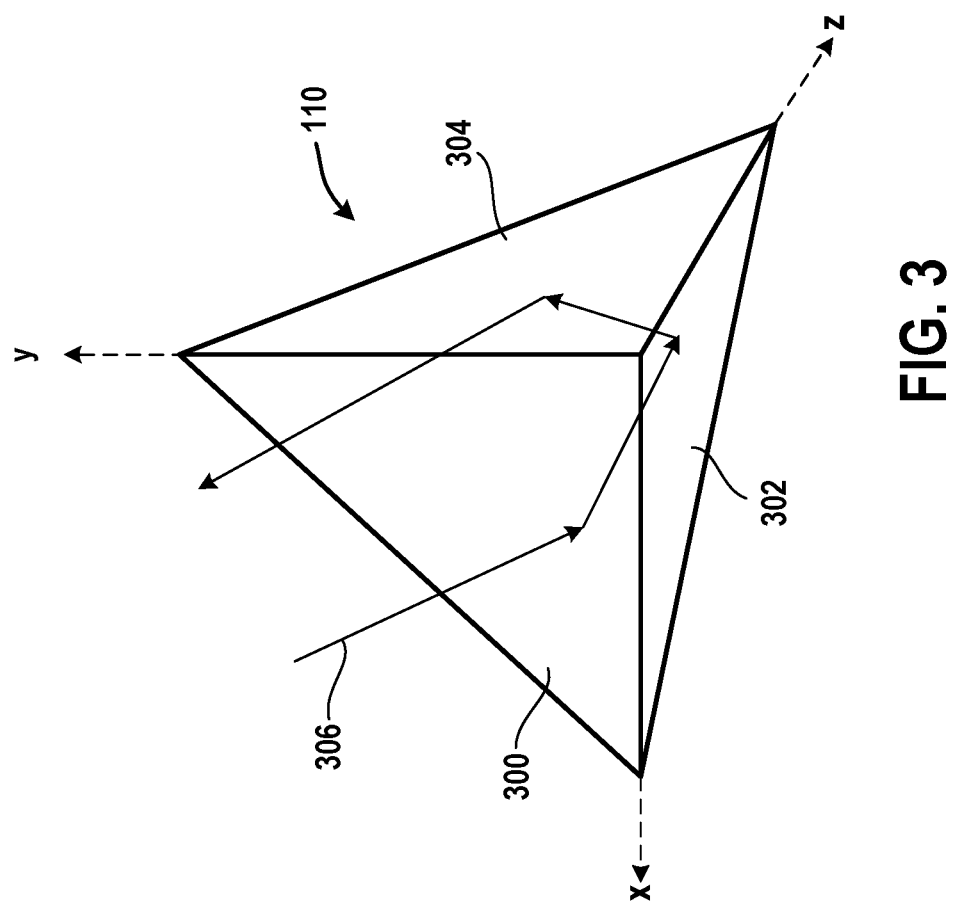
FIG. 3 illustrates a perspective view of a corner reflector, in accordance with implementations of the disclosure.

FIG. 3 illustrates a perspective view of a corner reflector, in accordance with implementations of the disclosure. As shown, the corner reflector 110 includes three reflective surfaces 300, 302, and 304, with each surface being perpendicular to the other two surfaces. The corner reflector 110 reflects EM waves back towards their source along a path parallel to, but in the opposite direction, as that along which they were emitted, the reflected beam returning in close proximity to the emitter. To accomplish this, the corner reflector reverses each of the coordinate components of the incoming EM wave.

For example, with continued reference to FIG. 3, the reflective surfaces are shown oriented relative to an x-y-z coordinate system, with the reflective surface 300 defined along the x-y plane, the reflective surface 302 defined along the x-z plane, and the reflective surface 304 defined along the y-z plane. An incoming EM beam 306, upon striking and being reflected from the surface 300, reverses the z-axis component of the beam. Upon striking the reflective surface 302, then the y-axis component is reversed; and upon striking the reflective surface 304, the x-axis component is reversed. The result is that the beam 306 is reflected by the corner reflector 110 back towards its source, along a path parallel to, but in the opposite direction, to the beam's incoming path.

A corner reflector is one example of a retroreflector that reflects light back towards its source. In other implementations, other types of retroreflectors that reflect light back towards its source in a similar manner can be used. For example, in some implementations, a spherical retroreflector is used in place of a corner reflector.

In some implementations, an array of retroreflectors can be used, such as an array of corner reflectors or spherical reflectors. In still other implementations, holographic retroreflectors can be used. Broadly speaking, a holographic retroreflector is a printed hologram that functions as a retroreflector. In some implementations, the holographic retroreflector is a printed hologram of a type of retroreflector (e.g. corner reflector) or an array of such retroreflectors. A holographic retroreflector can be advantageous for being flat, printable, and relatively low cost to produce. Given the nature of holograms, holographic retroreflectors can work well for monochromatic light sources that are the same frequency as that used to record the hologram.

Figure 4:
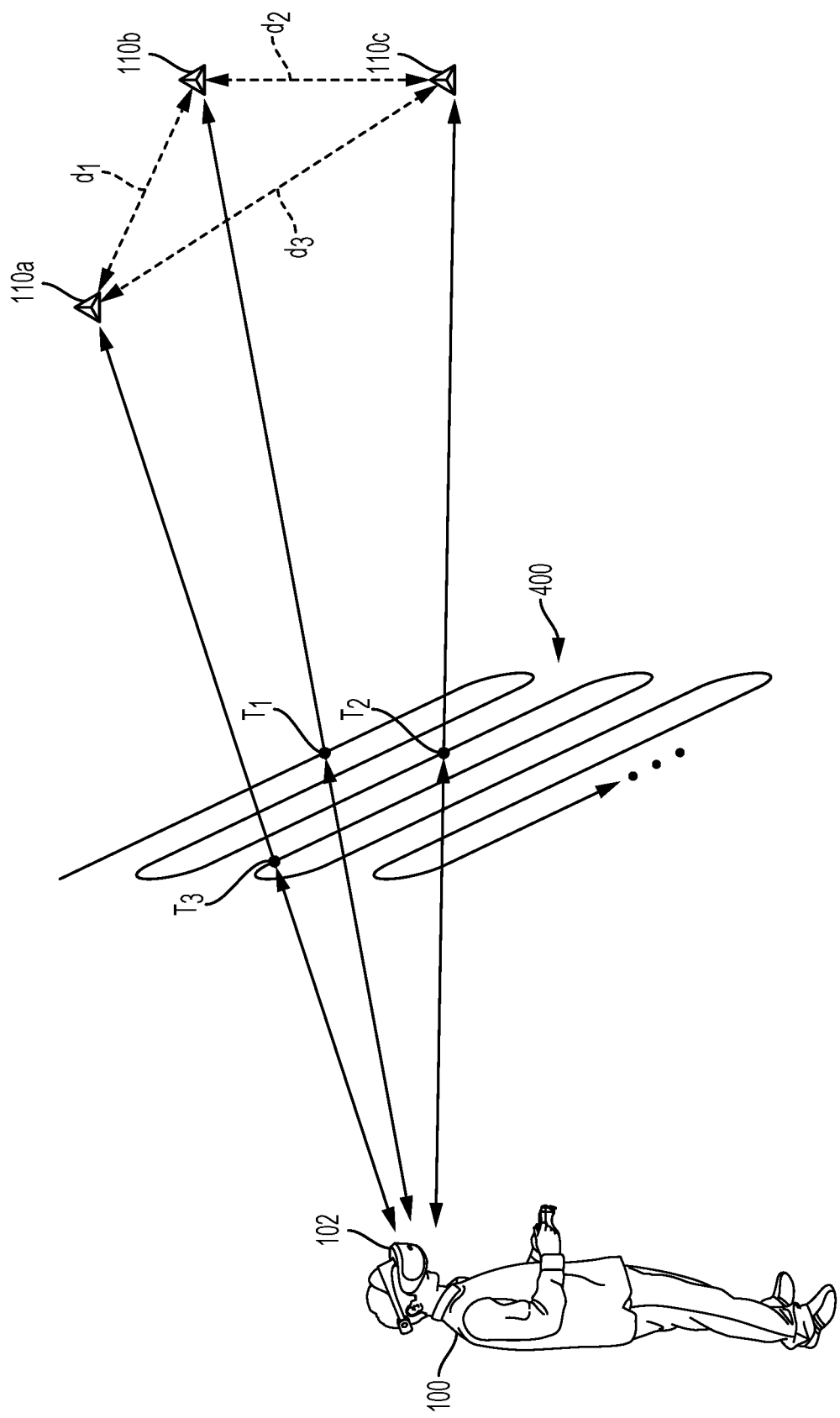
FIG. 4 conceptually illustrates the determination of HMD location and orientation based on a reflected scanning beam from a plurality of reflectors, in accordance with implementations of the disclosure.

FIG. 4 conceptually illustrates the determination of HMD location and orientation based on a reflected scanning beam from a plurality of reflectors, in accordance with implementations of the disclosure. In the illustrated implementation, the HMD 102 emits a scanning beam that traces a scan pattern, conceptually illustrated at reference 400. The scan pattern is conceptually illustrated as a raster scan pattern for purposes of illustrating an implementation. However, in other implementations, other types of scan patterns, such as a Lissajous scan pattern, can be utilized.

A plurality of reflectors 110a, 110b, and 110c are distributed in the local environment. When the scanning beam strikes one of the reflectors, the scanning beam is reflected back towards the HMD 102, and detected by the HMD 102. The enable HMD tracking based on detection of such reflections, the three-dimensional coordinate locations of the reflectors and/or the distances of the reflectors from each other are known. Various techniques for acquiring this information are provided in further detail below. In the illustrated implementation, $d_1$ is the distance between reflectors 110a and 110b; $d_2$ is the distance between reflectors 110b and 110c; $d_3$ is the distance between reflectors 110a and 110c.

As the scanning beam repeatedly traces the scan pattern, it strikes each of the reflectors at various time points. When the scanning beam strikes a reflector it is detected by the HMD 102, and the time of occurrence is recorded. In the illustrated implementation, at time $T_1$, the scanning beam strikes the reflector 110b; at time $T_2$, the scanning beam strikes the reflector 110c; at time $T_3$, the scanning beam strikes the reflector 110a. Each time is correlated to a specific point in the scan pattern that defines a particular direction of the scanning beam when it hit the given reflector. Using these directions of the scanning beam when reflected by the reflectors, and using the relative positions of the reflectors, the location and/or orientation of the HMD 102 relative to the reflectors and/or relative to the local interactive environment is determined.

The above-described process is repeated with successive sweeps of the scan pattern, to track the location and/or orientation of the HMD 102. Furthermore, it will be appreciated that the positions of the reflectors with respect to the scan pattern and/or the direction of the scanning beam can be tracked through successive sweeps of the scan pattern. As has been noted, HMD tracking information obtained through the scanning beam can be combined with information through other sensor mechanisms, and sensor fusion can be applied to track the HMD's location and orientation in the local interactive environment.

As noted above, in order to locate and track the HMD 102, the relative three-dimensional positions of the reflectors and/or their locations in the local interactive environment are first determined. This can be accomplished through various techniques in accordance with various implementations of the disclosure. In some implementations, the distances between the reflectors, or the locations of the reflectors are provided or input by a user of the system as part of a setup or initialization operation. In some implementations, the user is tasked with placement of the reflectors in accordance with a predefined arrangement. In some implementations, there may be multiple predefined arrangements that the user may choose from, and configuration of the system entails placement of the reflectors in accordance with one of the predefined arrangements, and possibly indication of which one has been deployed.

In other implementations, the locations or distances between the reflectors are automatically determined. For example, in some implementations, the reflectors are rigidly connected to each other in a known configuration, such that their locations or distances relative to each other are known. In some implementations, both user input and predefined reflector locations/distances can be used in combination with each other.

In some implementations, other techniques and/or sensors can be utilized to determine the locations and/or distances of the reflectors. In some implementations, proximity sensors or ranging sensors or a depth camera are included in the HMD 102 and used to determine distances to each of the reflectors. For example, a time-of-flight sensor/camera system can be utilized to determine the distances from the reflectors to the HMD 102, and this information can be used in conjunction with directional information to the reflectors (obtained as discussed above) to determine the locations of the reflectors in the local interactive environment. In some implementations, distances from the HMD 102 to the reflectors are determined at initialization, but not subsequently. Whereas in other implementations, distances from the HMD 102 to the reflectors are determined periodically or even continually.

In still other implementations, simultaneous localization and mapping (SLAM) techniques can be used to determine the locations of the reflectors. This may entail processing data from one or more cameras on the HMD 102, and/or inertial sensors of the HMD 102.

Broadly speaking, a minimum of three reflectors in a non-collinear arrangement will enable 3D tracking of the HMD 102 based on scanning beam reflections alone, provided that the three reflectors are positioned within the coverage area of the scanning beam's scan pattern. It will be appreciated that in various implementations, there may be more than three reflectors, or less than three reflectors. In implementations using less than three reflectors, sensor fusion with inertial sensors may help to disambiguate and be especially useful for HMD tracking.

Figure 5:
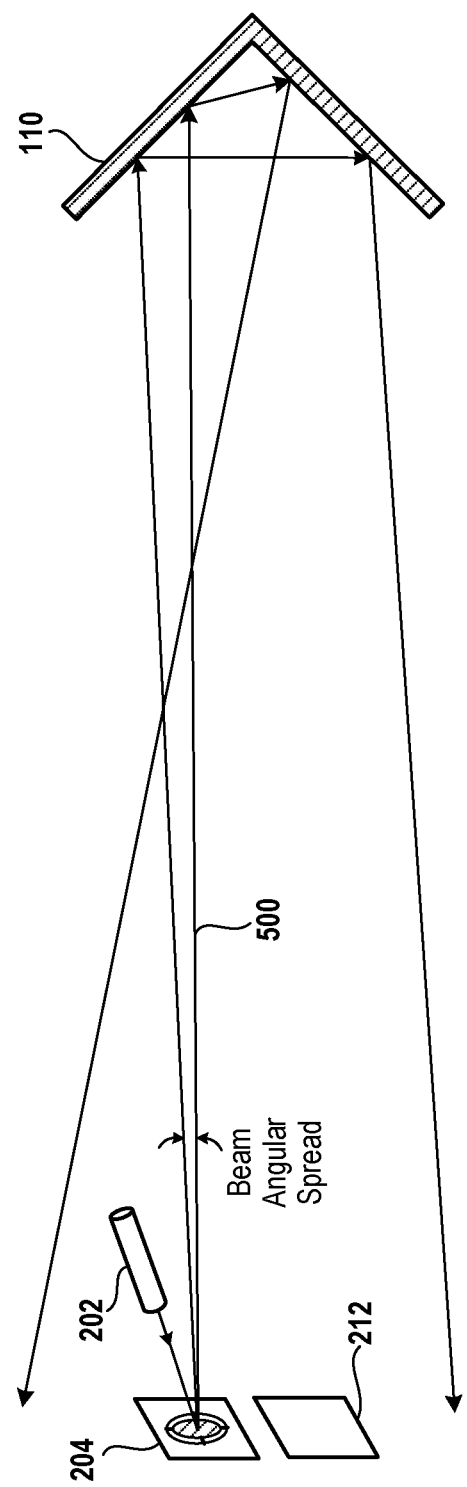
FIG. 5 illustrates a scanning beam having a predefined angular spread, in accordance with implementations of the disclosure.

FIG. 5 illustrates a scanning beam having a predefined angular spread, in accordance with implementations of the disclosure. In the illustrated implementation, a scanning beam 500 is conceptually shown, as it is directed by a MEMS mirror 204 and reflected by a reflector 110 that is shown in cross section. As has been noted, the reflector 110 is retroreflector that reflects the scanning beam 500 back towards its source (back towards the HMD 102) along a path parallel to its emission path but in the opposite direction, and typically translated by a small amount. As the reflected beam's path is typically translated from the emitted beam's path, the center of the reflected beam will tend to strike the HMD 102 at a location lateral to the MEMS mirror 204.

To increase the probability that the reflected scanning beam will strike a photosensor 212 (or other detection device) that is positioned lateral to the MEMS mirror 204, the scanning beam 500 can be configured to have a predefined angular spread (or beam divergence), such that the diameter of the scanning beam increases as distance traveled by the scanning beam increases. In some implementations, the angular spread of the scanning beam is configured so that when the HMD 102 is located at least a minimum distance from the reflector 110 (e.g. at least about one meter), then the reflected scanning beam will encompass the location of the photosensor 212. In this manner, there is a high probability that the reflected scanning beam will be detected by the HMD 102.

It will be appreciated that the angular spread or beam divergence of the scanning beam can be determined by the configuration of the beam generator 202, which may include optical hardware such as one or more lenses or mirrors that are configured to provide for the desired angular spread.

Furthermore, it is noted that the closer the HMD 102 is to the reflector 110, the less the scanning beam will diverge as the distance traveled by the scanning beam is reduced as compared to when the HMD 102 is further from the reflector 110. This may make it less likely that the reflected scanning beam will hit the photosensor 212. In the converse situation, when the HMD 102 is located at a greater distance from the reflector 110, the beam diverges to a greater extent. However, while this means that the reflected beam is more likely to hit the photosensor 212, it also means that the intensity of the reflected beam is reduced, which can make detection more difficult. Thus, in some implementations, the angular spread or beam divergence of the scanning beam is adjusted based on distance of the HMD 102 from the reflector 110. More specifically, as the distance of the HMD 102 from the reflector increases, the angular spread of the scanning beam is reduced. In some implementations, the angular spread is set during an initialization process prior to VR interactivity or gameplay. It is noted that the density of the scanning pattern also is of significance in the present discussion. For even with a small angular spread, if the density of the scan is sufficiently high, then the next scan sweep may hit the photo sensor. Thus, in some implementations, the angular spread may be adjusted in part based on the density of the scanning pattern (e.g. as defined by an angular separation between adjacent scan lines/rasters).

Figure 6:
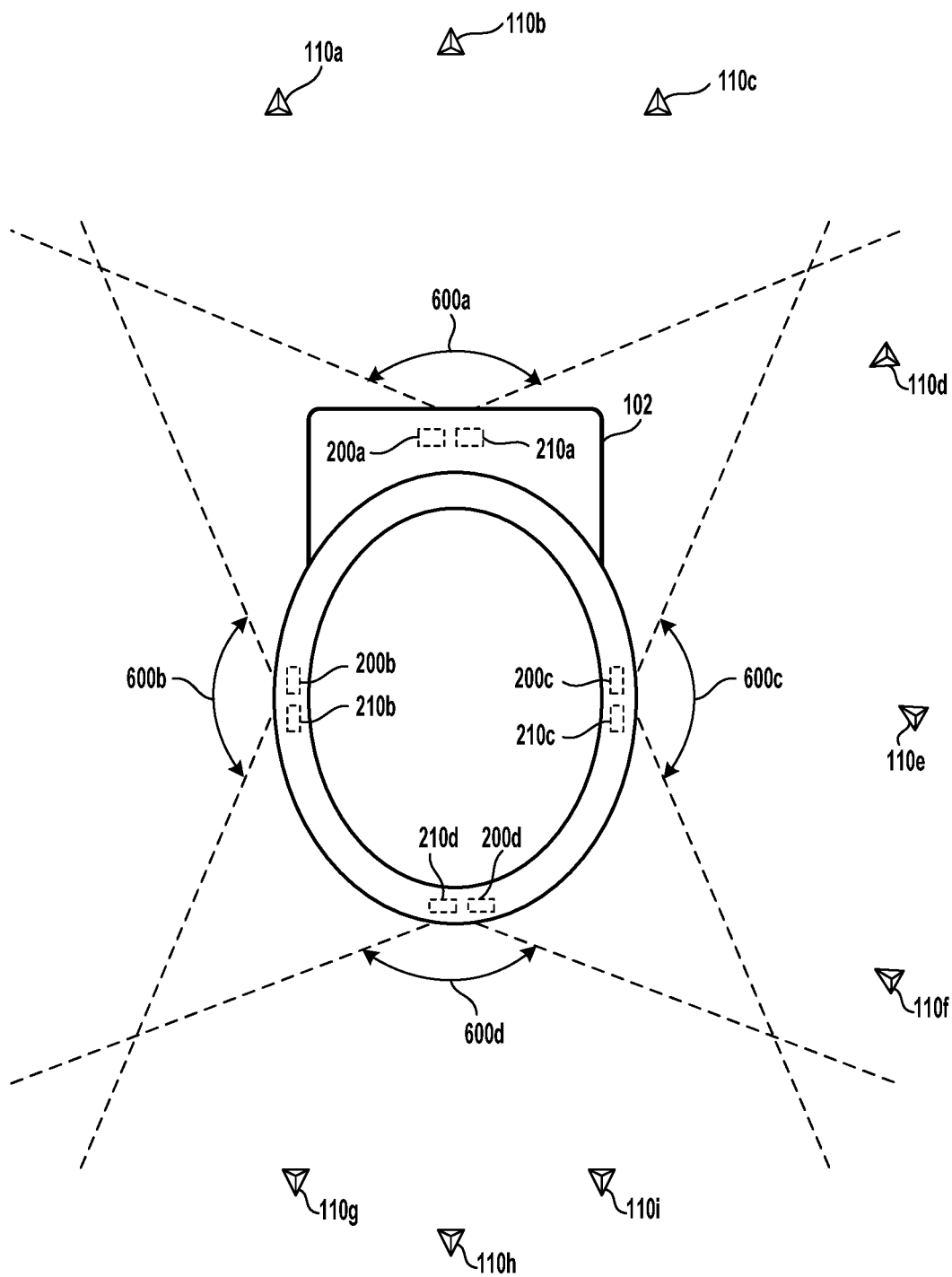
FIG. 6 illustrates a system for tracking an HMD, in accordance with implementations of the disclosure.

FIG. 6 illustrates a system for tracking an HMD, in accordance with implementations of the disclosure. An overhead view of an HMD 102 is provided, in an interactive environment having a plurality of reflectors. It will be appreciated that the reflectors presently described in accordance with implementations of the disclosure are advantageous over existing HMD tracking systems which typically rely upon wired peripherals such as cameras and sensors. For the wiring of such peripherals limits their placement, as well as the placement of the computer to which they must be connected, and the presence of such wires can be aesthetically unpleasing. By contrast, the reflectors of the present disclosure are easily placed at practically any location within the interactive environment, as they do not require any wiring. Furthermore, such reflectors can be positioned in discreet locations and easily distributed to various locations in the local environment, without requiring an additional power source such as a wired connection or batteries.

In the illustrated implementation, the HMD 102 is shown in an initial position, facing forward, which may also be considered a home or reference position for the HMD. Reflectors 110a, 110b, and 110c are positioned in front of the HMD 102. However, additional reflectors can be positioned at other locations relative to the HMD 102. For example, reflectors 110d, 110e, and 110f are laterally positioned to the side of the HMD 102. And reflectors 110g, 110h, and 110i are positioned behind the HMD 102. In some implementations, reflectors can be positioned below or above the HMD 102.

The HMD 102 includes an emitter 200a and corresponding detector 210a that function in accordance with implementations described herein, with the emitter 200a having an angular coverage area indicated at reference 600a. The various reflectors which are positioned at various locations can be used to track the HMD 102 when the coverage area of the emitter 200a encompasses towards such reflectors. That is, as the HMD 102 moves within the interactive environment, various subsets of the reflectors will fall within the coverage area of the emitter 200a, and these subsets can of the reflectors can be used to track the HMD 102.

For example, in the initial position, the reflectors 110a, 110b, and 110c are within the coverage area of the emitter 200a. When the user turns their head to the right (in a clockwise direction) and the HMD 102 is also similarly turned, the reflector 110a may no longer be within the coverage area of the emitter 200a. However, the reflector 110d may now be within the emitter's coverage area. Thus, the system switches from using reflectors 110a, 110b and 110c, to using reflectors 110b, 110c and 110d, to track the HMD 102. If the HMD 102 continues turning in a clockwise direction, then the subset of reflectors falling within the emitter's coverage area may further change, and this is recognized and tracking of the HMD 102 is accordingly based on the updated subset of reflectors (e.g. reflectors 110d, 110e and 110f when the HMD 102 is turned to the right (approximately 90 degrees clockwise from the initial position); reflectors 110g, 110h and 110i when the HMD 102 is fully turned around (approximately 180 degrees) from the initial position).

As has been noted above, an initialization operation can be performed to identify the (three-dimensional) locations of the reflectors, and the initial reference pose of the HMD. In some implementations wherein the placement of the reflectors exceeds the coverage area of the HMD's emitter(s), then the user may be tasked with moving the HMD 102 about so as to enable detection of all of the reflectors, and, for example, determination of distances to each of the reflectors and/or their locations.

In some implementations, the HMD 102 includes multiple emitters that cover different areas of space. By way of example, in the illustrated implementation shown at FIG. 6, the HMD 102 includes emitters 200b, 200c, and 200d, having angular coverage areas conceptually shown at reference numerals 600b, 600c, and 600d, respectively; and respective corresponding detectors 210b, 210c, and 210d are also shown. In some implementations, the emitters 200a, 200b, 200c, and 200d (and their corresponding detectors) can be selectively operated depending upon the location and orientation of the HMD 102.

For example, in a setup having only the reflectors 110a, 110b, and 110c, as discussed above, when the HMD 102 is sufficiently rotated in a clockwise direction from its initial position, the reflector 110a may no longer fall within the coverage area of the emitter 200a. When this occurs, the emitter 200b and detector 210b can be activated to detect the reflector 110a, as the reflector 110a now falls within the coverage area 600b of the emitter 200b; and emitter 200a and detector 210a may be deactivated. Thus, the HMD 102 is configured to switch from using the emitter 200a (and detector 210a) to using the emitter 200b (and detector 210b) when the HMD 102 is moved/reoriented such that the reflector 110a moves out the coverage area 600a of the emitter 200a and into the coverage area 600b of the emitter 200b.

In some implementations, the coverage areas of the emitters 200a and 200b overlap, so that a given reflector can be detected using both the emitters 200a and 200b and directional location of the given reflector can be tracked across different emitter/detector groups. In some implementations, when a given reflector is determined to be directionally located at or near an edge region of the emitter's coverage area, then an adjacent emitter/detector group is activated to enable continued tracking of the reflector in the event that it becomes no longer located within the coverage area of the original emitter's coverage area. In some implementations, when multiple emitters are activated, then the emissions of the emitters can be time-division multiplexed so as not to interfere with one another. In some implementations, multiple emitters are activated, but without being time-division multiplexed. If the reflected beams are sufficiently coincident with their corresponding emitted beams and/or the emitters (and their corresponding sensor(s)) are sufficiently spaced apart from each other, then the reflected beams may not interfere with each other and therefore time-division multiplexing is unnecessary.

Though in the foregoing description, specific implementations using reflectors and emitters/detectors have been described for purposes of illustrating principles of the present disclosure, it will be appreciated that in other implementations the number and placement of reflectors, as well as the number and placement of emitters/detectors on the HMD 102, can vary. It should be appreciated that the flexibility of the presently described systems allows for many variations in accordance with the principles of the present disclosure. In some implementations, a plurality of emitter/detector groups are provided on the HMD 102, and at initialization, the locations of reflectors is determined, and those emitter/detector groups that cover the reflectors are activated to enable tracking of the HMD 102. Thus, for example, it is possible to have a scenario wherein reflectors are only placed behind the HMD 102, and thus, only an emitter/detector group covering such a region (e.g. emitter 200d and detector 210d) is initially activated. As noted, the emitter/detector groups of the HMD 102 can be activated and deactivated as the locations of the reflectors relative to the coverage areas of the emitter/detector group change.

FIG. 7 illustrates various arrangements of emitters and detectors for an HMD, in accordance with implementations of the disclosure. An HMD 102 as shown includes at least one emitter/detector group 700, which can have various forms and arrangements in accordance with various implementations of the disclosure. For example, as illustrated at reference 700a, the emitter/detector group can be defined to include a centrally positioned emitter 702 (e.g. MEMS mirror, microscanner, etc.) and several photosensors 704 that are laterally positioned surrounding the emitter 702. The photosensors 704 are positioned adjacent to the emitter 702 so as to detect the reflected scanning beam as described elsewhere herein.

In some implementations, the detector is housed within the emitter assembly. In other words, the reflected beam comes directly back into the emitter, striking the MEMs mirror and reflecting back towards the illumination source which can also contain the photo sensitive elements, too.

In another implementation shown at reference 700b, the emitter/detector group can include multiple emitters 706, 708, and 710, with photosensors 712 positioned laterally surrounding the emitters. In some implementations, the multiple emitters 706, 708, and 710 are directed to encompass different angular coverage areas, thereby expanding the total angular coverage area of the emitter/detector group. In some implementations, the emitters 706, 708, and 710 are time division multiplexed in operation, and/or operated on-demand depending upon which emitter is best-suited to track the reflectors and thereby enable tracking of the HMD 102.

In the implementation shown at reference 700c, emitters 714, 716, and 718 are positioned adjacent to each other in a linear arrangement. Emitter 714 has corresponding photosensors 720; emitter 716 has corresponding photosensors 722; and emitter 718 has corresponding photosensors 724. The photosensors are shown positioned laterally surrounding their corresponding emitters.

In some implementations, other types of detectors are employed, such as image sensors (e.g. CCD, CMOS, etc.). In the implementation shown at reference 700d, a centrally positioned emitter 726 is surrounded by a plurality of image sensors 728, 730, 732, and 734. The image sensors capture image frames of the interactive environment, and are sensitive to the wavelength/frequency of the scanning beam. The captured image frames from the image sensors are analyzed to identify when the scanning beam has been reflected from a reflector in the interactive environment.

In another implementation shown at reference 700e, an emitter 736 is surrounded by an image sensor 738.

Figure 8A:
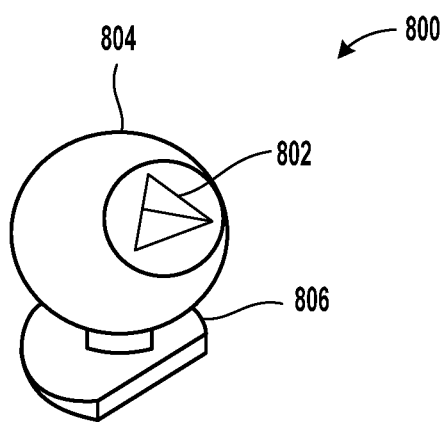
FIG. 8A illustrates a reflector assembly 800, in accordance with implementations of the disclosure.

It will be appreciated that a reflector in accordance with implementations of the present disclosure can have any form, provided it is configured to reflect an incoming EM beam back towards its source, or back towards the HMD. FIG. 8A illustrates a reflector assembly 800, in accordance with implementations of the disclosure. The reflector assembly 800 includes a corner reflector 802 that includes three mutually perpendicular mirrors. The corner reflector 802 is contained within a housing 804 that is mounted to a base 806, the base 806 providing stability of the reflector 800 when placed on a surface.

In some implementations, the housing 804 is connected to the base 806 by an adjustable joint that enables the position of the housing 804 relative to the base 806 to be adjusted, so that the corner reflector 802 can be optimally positioned. Broadly speaking, the reflector assembly 800 should be adjusted so that the corner reflector 802 faces towards the HMD. Examples of an adjustable joint include, without limitation, a ball-and-socket type joint, one or more knuckle joints, etc. In some implementations, the housing 804 is detachable from the base 806; in some implementations, the housing 804 rests on top of the base 806; in some implementations, the housing 804 is secured to the base 806 by a magnet or other detachable mechanism. In various implementations, the adjustable joint enables adjustment of the altitude and/or the azimuth of the corner reflector 802.

In some implementations, the corner mirror 802 is covered by a window or filter that allows transmission of the wavelength/frequency of the scanning beam. In some implementations such a window/filter is also configured to block transmission of at least some other wavelengths/frequencies. For example, in a system in which the scanning beam is in the IR spectrum, the window may be configured to permit transmission of IR frequencies, but also block visible light frequencies. In this manner, the visibility of the corner reflector 802 in the local interactive environment will be reduced, rendering it more discreet.

Figure 8B:
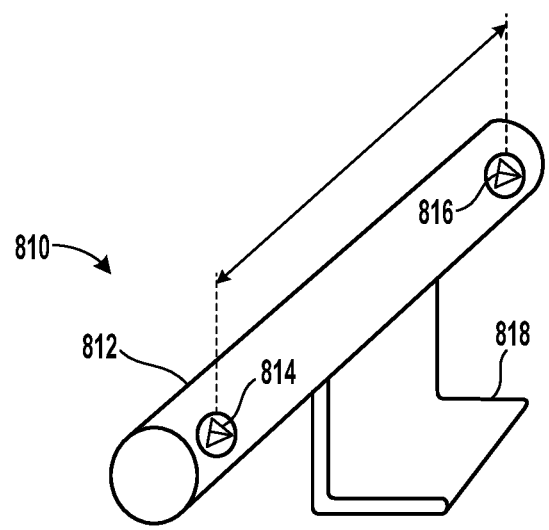
FIG. 8B illustrates a reflector assembly having multiple reflectors, in accordance with implementations of the disclosure.

FIG. 8B illustrates a reflector assembly having multiple reflectors, in accordance with implementations of the disclosure. The reflector assembly 810 includes corner reflectors 814 and 816 contained within a housing 812. As the corner reflectors are rigidly mounted within the same housing, the relative positions of the corner reflectors to each other and/or the distance between the corner reflectors is predefined, which as noted above, is useful for purposes of tracking the HMD's location and orientation in the local interactive environment.

The housing 812 is mounted to a base 818. The base 818 can be adjustable to enable adjustment of, for example, the altitude and/or azimuth of the corner reflectors 814 and 816.

Figure 8C:
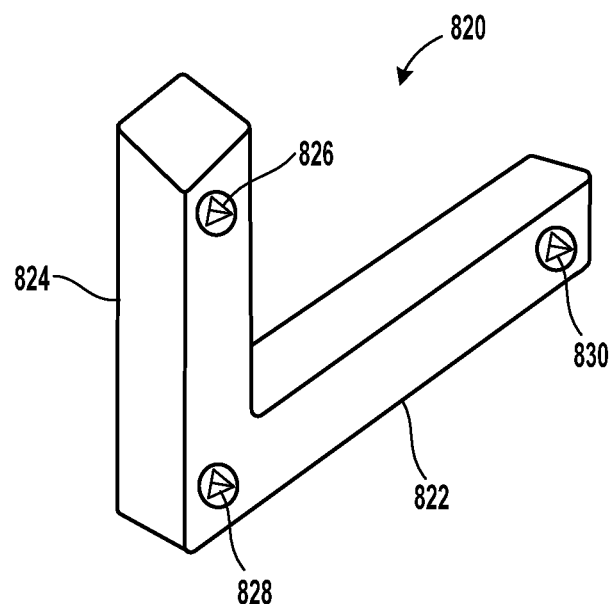
FIG. 8C illustrates a reflector assembly having multiple reflectors, in accordance with implementations of the disclosure.

FIG. 8C illustrates a reflector assembly having multiple reflectors, in accordance with implementations of the disclosure. The reflector assembly 820 includes a housing consisting of two arms 822 and 824 that are joined together. In the illustrated implementation, three corner reflectors 826, 828, and 830 are disposed in the housing in a non-collinear arrangement. As the corner reflectors are rigidly mounted within the same housing, the relative positions of the corner reflectors to each other and/or the distance between the corner reflectors is predefined, which as noted above, is useful for purposes of tracking the HMD's location and orientation in the local interactive environment.

Figure 8D:
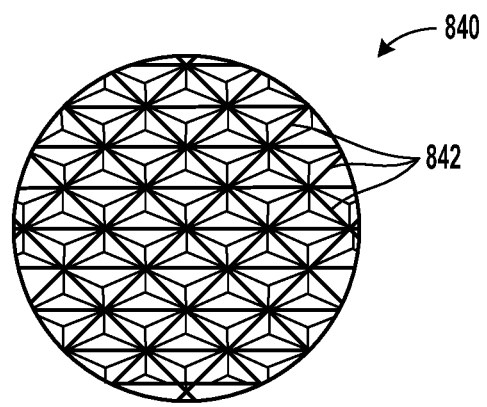
FIG. 8D illustrates a reflector assembly having many corner reflectors, in accordance with implementations of the disclosure.

FIG. 8D illustrates a reflector assembly having many corner reflectors, in accordance with implementations of the disclosure. As shown, the reflector assembly 840 includes an array of corner reflectors 842 that are arranged adjacent to each other. The array of corner reflectors functions collectively as a single reflector in accordance with implementations of the disclosure.

Figure 9:
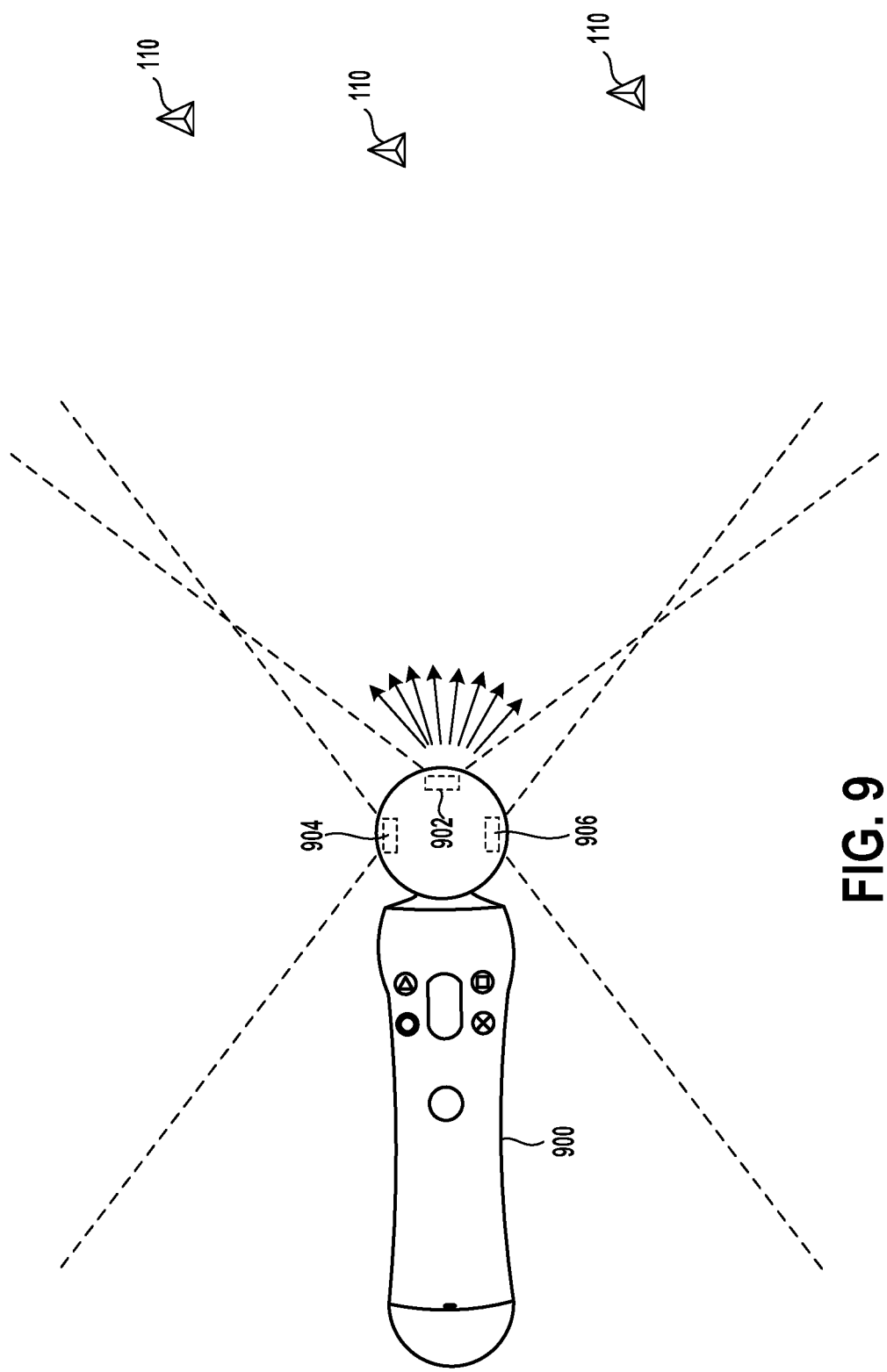
FIG. 9 illustrates a motion controller have emitter/detector assemblies for tracking based on a reflected scanning beam, in accordance with implementations of the disclosure.

Though implementations of the present disclosure have been described with reference to emitters and detectors included in an HMD for purposes of tracking the HMD, it will be appreciated that such emitters and detectors can be included in other devices to enable tracking of such devices. By way of example, FIG. 9 illustrates a motion controller have emitter/detector assemblies for tracking based on a reflected scanning beam, in accordance with implementations of the disclosure. As shown, the motion controller 900 includes an emitter/detector assembly 902 that includes at least one emitter that emits a scanning beam, and at least one detector that detects the reflected scanning beam from one of the reflectors 110. The principles of operation are similar to those described above with respect to tracking an HMD, and are utilized in the present implementation to track the location and/or orientation of the motion controller 900 in the local interactive environment. The motion controller 900 may further include additional emitter/detector assemblies 904 and 906, that cover additional regions of space relative to the motion controller 900, and which may be activated on-demand in a similar fashion to that described above with respect to the HMD.

In some implementations, the motion controller 900 is operated in conjunction with the HMD 102. In such implementations, the emitters of the HMD 102 and motion controller 900 can be time-division multiplexed.

Figure 10:
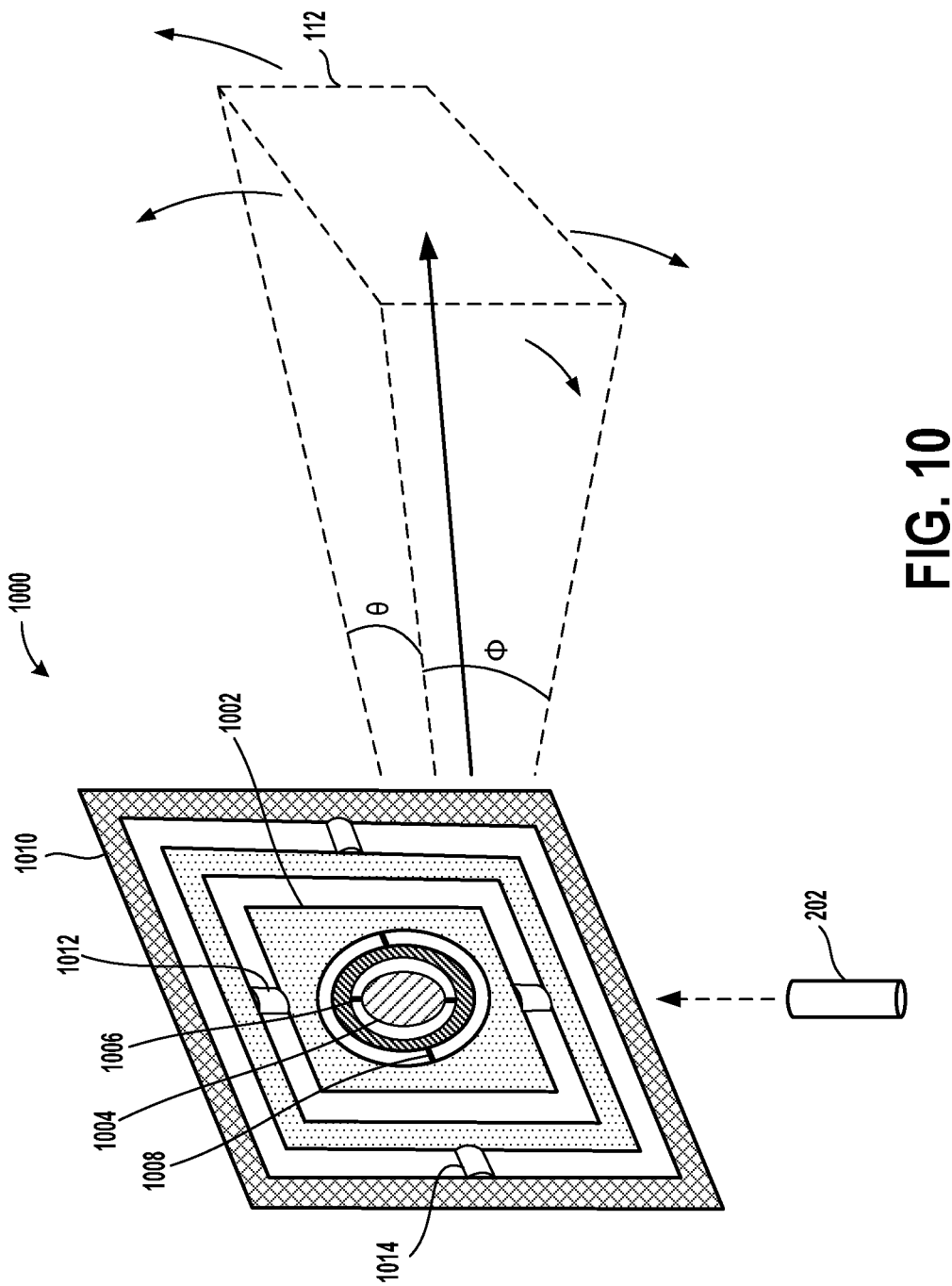
FIG. 10 conceptually illustrates a MEMS mirror assembly that allows the scanning range of a MEMS mirror to be shifted, in accordance with implementations of the disclosure.

FIG. 10 conceptually illustrates a MEMS mirror assembly that allows the scanning range of a MEMS mirror to be shifted, in accordance with implementations of the disclosure. The MEMS mirror assembly 1000 includes a first subassembly 1002, which includes the componentry of a state-of-the-art MEMS mirror. As shown, the subassembly 1002 includes a mirror plate 1004, as well as actuators 1006 and 1008 which effect rotation/oscillation of the mirror plate 1004 about respective axes. The first subassembly 1002 is a MEMS mirror that projects a scanning beam in accordance with a predefined scan pattern 112. For example, the scanning beam may have a horizontal angular range θ, and a vertical angular range cp. However, as noted previously, when the HMD 102 is moved, the scanning beam's range of coverage may no longer encompass the reflectors in the local environment.

Therefore, in the illustrated implementation, the first subassembly 1002 is configured to be adjustable so as to redirect the entire scan pattern to maintain coverage of the reflectors. As conceptually shown, the first subassembly 1002 is further mounted to a second subassembly 1010 that is capable of moving the first subassembly 1002 to change the overall direction of the scan pattern relative to the HMD. By way of example, the second subassembly 1010 can include actuators 1012 and 1014 which are configured to rotate the first subassembly 1002 about respective axes. In this manner, the scan pattern produced by the scanning beam can be shifted relative to the HMD.

Figure 11:
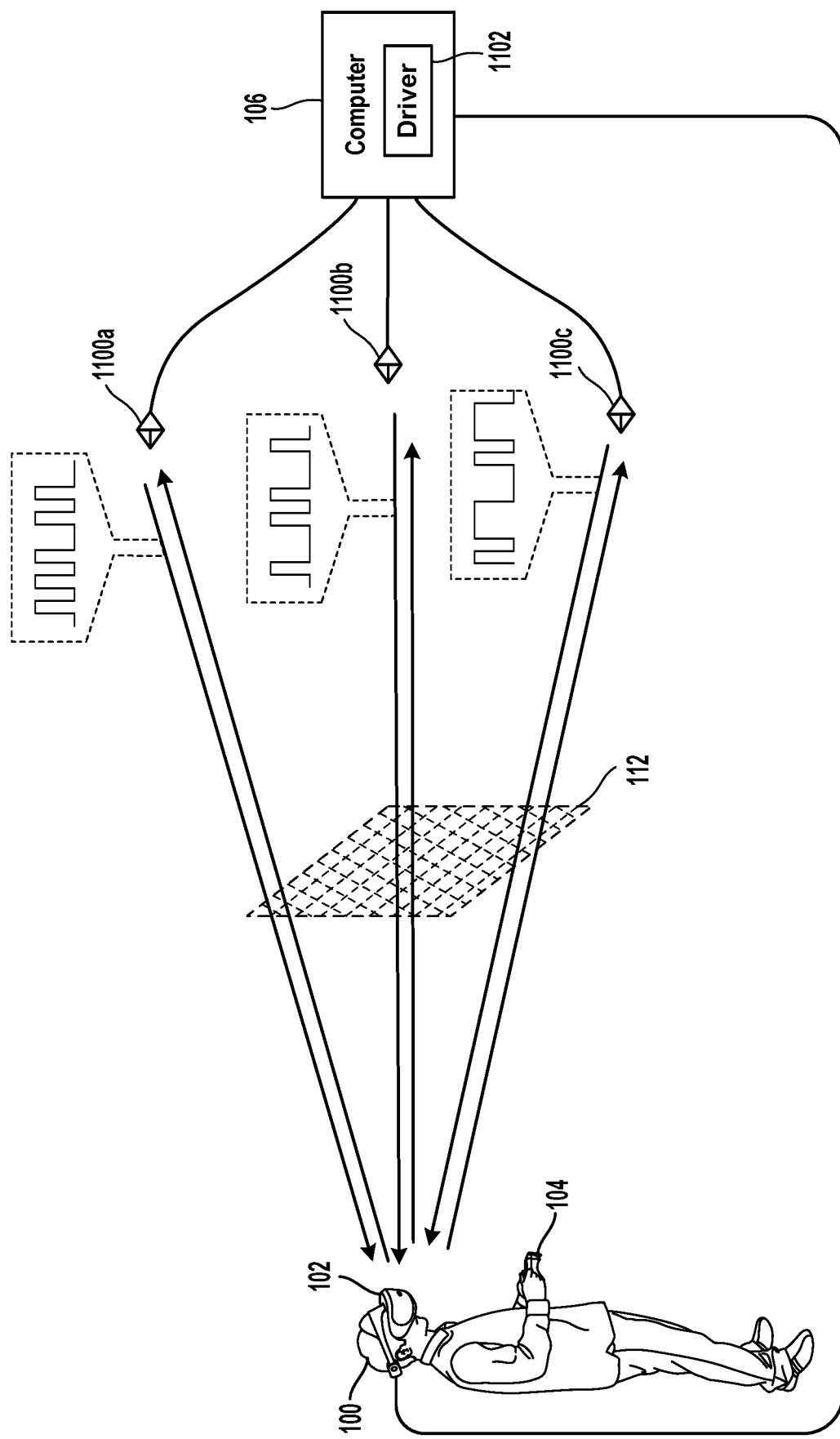
FIG. 11 illustrates a system for tracking an HMD using modulating retroreflectors, in accordance with implementations of the disclosure.

While implementations of the disclosure have been described with reference to various types of passive retroreflectors, in some implementations, the retroreflectors may be modulating/active retroreflectors. Broadly speaking, a modulating/active retroreflector reflects a signal back towards its source, but is also capable of modulating the reflected signal (e.g. by on/off cycling of an electronically actuated shutter). FIG. 11 illustrates a system for tracking an HMD using modulating retroreflectors, in accordance with implementations of the disclosure. The user 100 is shown in an interactive local environment viewing a virtual space through an HMD 102, while operating a controller device 104. As previously described the HMD 102 is configured to emit a scanning beam that traces a predefined scan pattern 112.

Modulating retroreflectors 1100a, 1100b, and 1100c are provided in the illustrated implementation. In some implementations, the modulating retroreflectors 1100a, 1100b, and 1100c, are connected to computing device 106. The computing device 106 further includes an electronic driver module 1102 that generates electronic signals for the modulating retroreflectors. Each modulating retroreflector is provided with an electronic signal that controls the operating state of the modulating retroreflector, e.g. selecting between "on" and "off" states, wherein in the "on" state the modulating retroreflector will reflect an incoming beam back to its source with maximum efficiency (without modulation to the extent possible; e.g. similar to a passive retroreflector), whereas in the "off" state the modulating retroreflector will not (substantially) reflect an incoming beam back to its source. In some implementations, a modulating retroreflector can be controlled to adjust its transmissivity throughout a continuous/discrete range, or a range of various states, so as to modulate a beam that is reflected by the retroreflector.

In accordance with some implementations, by controlling the (e.g. on/off) states of the modulating retroreflectors, it is possible to encode a reflected beam from a given modulating retroreflector to have a unique repeating code/signature. This enables the reflected beam to be uniquely identified, and hence the modulating retroreflector that reflected the signal can be identified based on analyzing the reflected beam to determine its code. Using this information, it is possible to identify and track which of the modulating retroreflectors 1100a, 1100b, and 1100c is which from the standpoint of the HMD 102. Thus, the specific retroreflector that reflects back the scanning beam at any given moment is known with a high degree of confidence, which enables the tracking of the HMD's 102 location and/or orientation to be more accurate and more easily performed.

Broadly speaking, the length of the code for a given retroreflector is configured to be enough to enable unique codes for each retroreflector in the system while further providing properties for helping with code identification (e.g. reducing errors and improving disambiguation of codes). By way of example without limitation, in a system where an HMD has on the order of tens of modulating retroreflectors (e.g. as described with reference to FIG. 14A-C below) and tracked objects (e.g. controller device 104) have a similar number of modulating retroreflectors, then in some implementations, approximately 100 unique codes would be sufficient to provide a unique code for each modulating retroreflector and thereby enable individual identification. In some implementations, this can be accomplished robustly with approximately 10 bits. In other implementations, the code length may be greater than or less than 10 bits.

Further by way of example without limitation, in some implementations, for a nominal 60 Hz tracking cycle, with a ten bit code length, then a modulation rate of approximately 100 Mbits/sec or greater is desirable. Such modulation rates have been demonstrated with optical modulation technology such as electro-absorption modulators (EAM). The foregoing examples of various parameters are provided by way of example only, and it will be appreciated that depending upon the desired update rate and/or the number of simultaneously identifiable modulating retroreflectors, the parameters such as code length and modulation rates can be adjusted to provide suitable performance to enable identification of the retroreflectors using the principles presently described.

Another method by which modulating retroreflectors may be identified utilizes the concept of beat frequencies. In some implementations, the emitter (that emits the scanning beam) is configured to modulate the amplitude of the scanning beam at a frequency F; and, each modulating retroreflector is configured to apply a sinusoidal cycling of its transmissivity at a certain frequency $F_x$ that is unique to each modulating retroreflector "x." Thus, a given modulating retroreflector "x" will reflect back the scanning beam with a transmissivity cycle of $F_x$. The "beat frequency" is the (absolute value of the) difference between the frequencies, i.e. abs($F-F_x$). By way of example without limitation, if the scanning beam is emitted with a sinusoidal amplitude frequency of 100 Mhz and a first modulating retroreflector has a frequency $F_1=60$ Mhz then the beat frequency will be 40 Mhz. A second retroreflector may have a frequency $F_2=70$ Mhz with a resulting 30 Mhz beat frequency, etc. As each retroreflector has a unique frequency of modulation, the returning beat frequency from each retroreflector will also be unique. Hence, the various possible beat frequencies can be correlated to the retroreflectors, and by measuring the returning beat frequency of a reflected scanning beam, the system can identify the specific retroreflector from which the reflected scanning beam was reflected.

It is noted with reference to the implementation of FIG. 2 that the signal processing logic 214 of the detector 210 of the HMD 102 can be further configured to identify/determine the particular code that is encoded in a reflected beam that has been detected. Based on the identified code, the HMD tracking logic 216 identifies the particular modulating retroreflector that reflected the beam that was detected. And using this information, the HMD tracking logic 216 determines the location and/or orientation of the HMD 102. By enabling specific identification of each modulating retroreflector, the tracking of the HMD 102 can be more robust and more easily achieved, as the retroreflectors which serve as reference points in the local environment are easily distinguishable from each other. Furthermore, from one session to the next, provided that the modulating retroreflectors retain their positions in the local environment, then the initiation of HMD tracking is more easily achieved because each of the retroreflectors can be practically instantaneously recognized and uniquely identified.

Figure 12A:
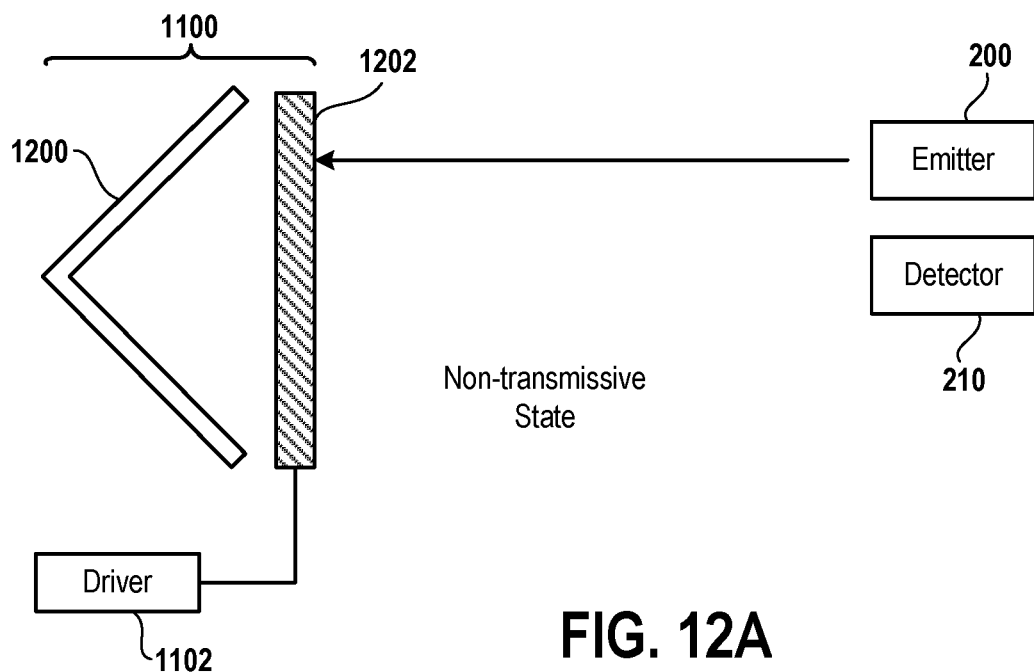
FIGS. 12A and 12B illustrates componentry of an example of a modulating retroreflector, in accordance with implementations of the disclosure.

It will be appreciated that in various implementations, any type of modulating retroreflector can be used for purposes of enabling identification of retroreflectors for HMD tracking in accordance with implementations of the disclosure. FIG. 12A illustrates componentry of an example of a modulating retroreflector, in accordance with implementations of the disclosure. In the illustrated implementation, the modulating retroreflector 1100 includes an optical retroreflector 1200 and an optical modulator 1202. The optical retroreflector 1200 can be a corner reflector in some implementations, or other types of retroreflectors in other implementations such as a cat's eye retroreflector, holographic retroreflector, etc.

The optical modulator 1202 is positioned at the aperture of the optical retroreflector 1200 so as to govern the entry of the scanning beam into the optical retroreflector 1200 to reach the reflective optics of the optical retroreflector 1200. Thus positioned, the optical modulator 1202 in some implementations effectively functions as an electronic shutter, controlling the passage of the scanning beam through itself. The optical modulator 1202 can be any type of device that is controllable to modulate the transmission of a scanning beam from the emitter 200. In some implementations, the optical modulator 1202 is an electro-absorption modulator (EAM), such as a (multiple) quantum well EAM. In some implementations, the optical modulator 1202 is an LCD shutter or pi-cell shutter.

In some implementations, the optical retroreflector 1200 and the optical modulator 1202 are combined in the form of a Bragg hologram or an electronically switchable Bragg grating (ESBG).

An electronic driver 1102 supplies an electrical signal to the optical modulator 1202. In some implementations, the presence of an electrical signal causes the optical modulator 1202 to be in a non-transmissive state, whereas in other implementations the absence of the electrical signal causes the optical modulator 1202 to be in a non-transmissive state. In the illustrated implementation shown at FIG. 12A, the optical modulator 1202 is in a non-transmissive state, such that the emitted scanning beam is blocked by the optical modulator 1202.

Figure 12B:
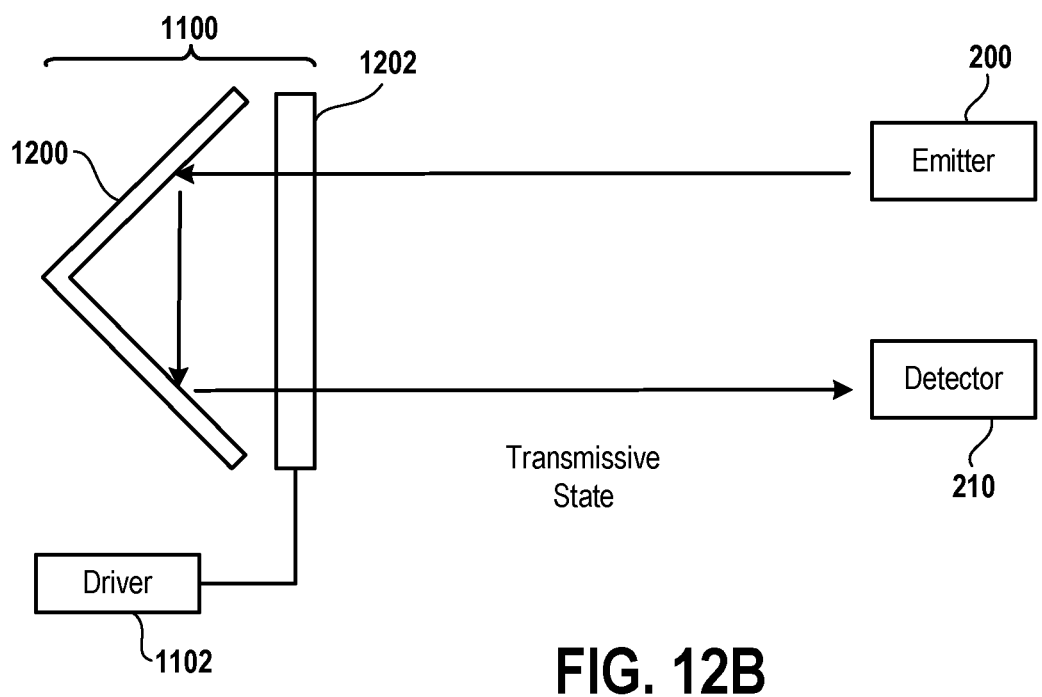

With reference to FIG. 12B, the system is shown in a transmissive state, in accordance with implementations of the disclosure. That is, the optical modulator 1202 is controlled by the electronic driver 1102 to be in a transmissive state, permitting the scanning beam from the emitter 200 to enter the aperture of the optical retroreflector 1200. As such, the scanning beam is reflected by the optical retroreflector 1200 and detected by the detector 210.

By controlling the transmissive and non-transmissive states of the optical modulator 1202, the reflected scanning beam can be encoded with a unique code that identifies the modulating retroreflector.

Figure 13A:
FIGS. 13A and 13B conceptually illustrate a cross-section of a modulating retroreflector, in accordance with implementations of the disclosure.

FIG. 13A conceptually illustrates a cross-section of a modulating retroreflector, in accordance with implementations of the disclosure. In the illustrated implementation, the modulating retroreflector 1300 is defined in the form of a corner reflector including facets 1302 and 1304 as shown. (The third facet is not shown in the illustrated cross-section.) However, one of the facets of the corner reflector—the facet 1304—is defined by a deformable mirror.

In the illustrated implementation, modulating retroreflector 1300 is shown in an (e.g. unpowered) retroreflective state, such that the deformable mirror of facet 1304 is substantially flat. In this state, then the modulating retroreflector 1300 acts as a normal corner reflector, reflecting the scanning beam from the emitter 200 back to the detector 210 with high efficiency.

Figure 13B:
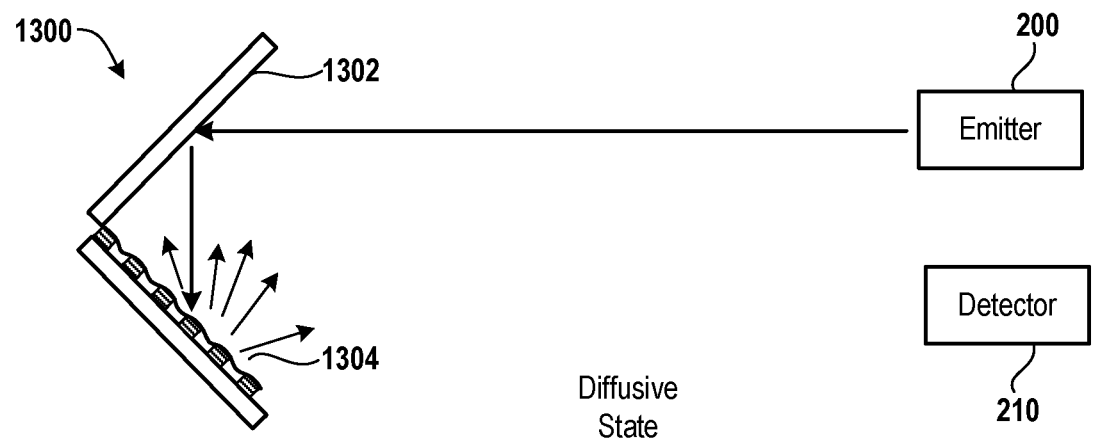

However, with reference to FIG. 13B, the modulating retroreflector 1300 is shown in a (e.g. powered) diffusive state. By powering the deformable mirror of the facet 1304 the surface becomes deformed so as to scatter the incoming scanning beam. The result is that the incoming scanning beam is not reflected back to the detector 210 to any significant extent. That is, when in the diffusive state, the intensity of any potentially reflected portion of the scanning beam that is directed towards the detector is significantly lower than that occurring during the retroreflective state.

Thus, using the retroreflective and diffusive states, the intensity of the scanning beam that is reflected by the modulating retroreflector 1300 can be modulated to, as noted previously, encode a unique identifying code that corresponds to the modulating retroreflector 1300, thereby enabling its identification.

Figure 14A:
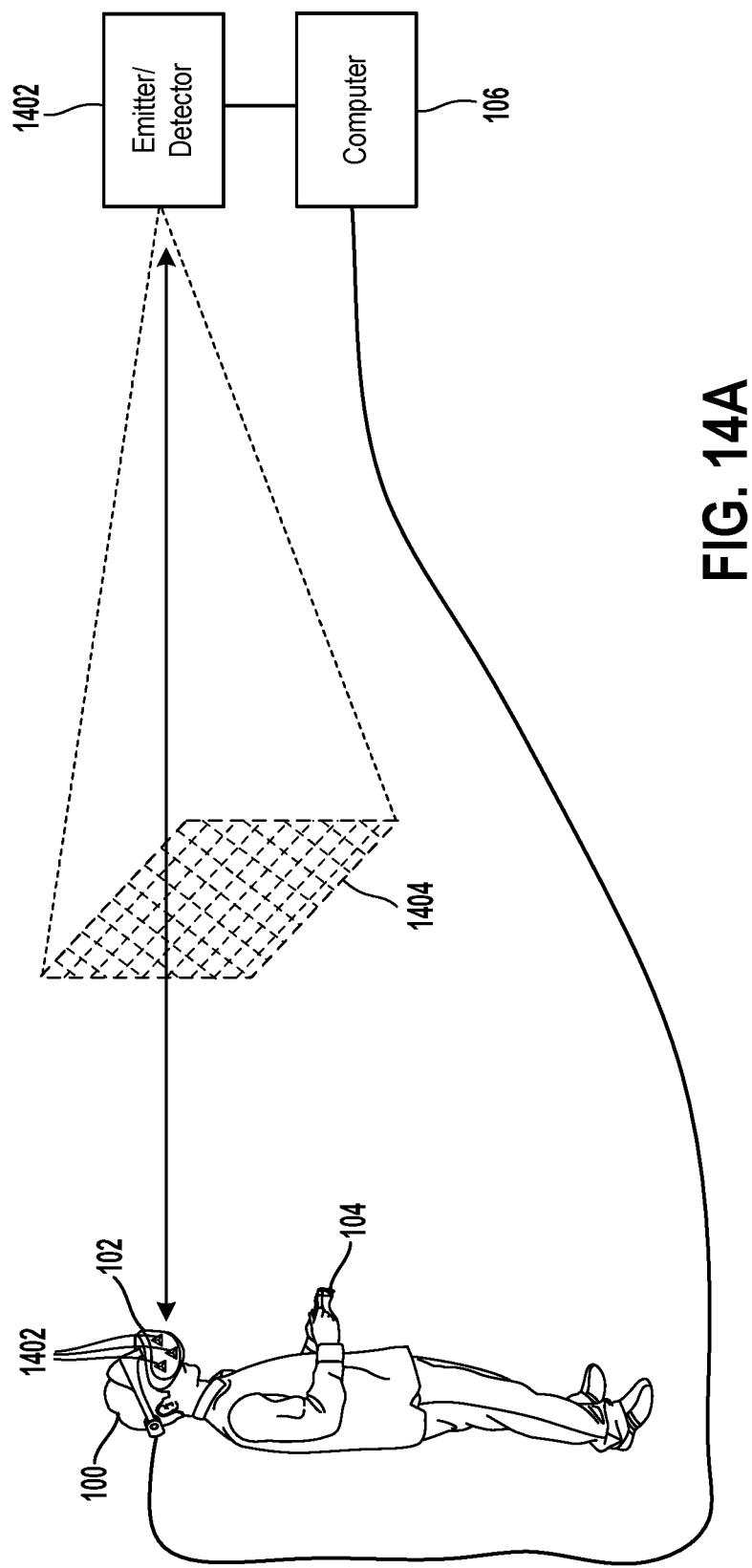
FIG. 14A illustrates a system for tracking an HMD in a local environment, in accordance with implementations of the disclosure.

Implementations of the present disclosure have been described wherein the HMD 102 includes an emitter/detector that emits a scanning beam that is reflected by retroreflectors positioned in the local environment. However, in other implementations, the componentry described is configured in a reverse setup, wherein the HMD includes a plurality of retroreflectors, and one or more emitter/detector units are positioned in the local environment. Such a setup is shown at FIG. 14A, which illustrates a system for tracking an HMD in a local environment, in accordance with implementations of the disclosure. An emitter/detector unit 1402 is positioned in the local environment and includes both an emitter for emitting a scanning beam and a detector for detecting the scanning beam when it has been retroreflected back to the emitter/detector 1402, similar to the emitter and detector componentry previously described. The scanning beam traces a predefined scan pattern 1404, similar to that which has also been previously described.

The HMD 102 includes a plurality of retroreflectors 1402 that are configured to reflect the scanning beam back towards the emitter/detector unit 1402 when hit by the scanning beam. As previously discussed, the directional location of a given retroreflector relative to the emitter/detector unit 1402 can be determined from the time that a reflected beam is detected. Thus, with a sufficient number of retroreflectors distributed on the HMD 102, the directions of multiple ones of the retroreflectors relative to the emitter/detector unit 1402 can be determined and tracked. Using this information and the known positioning of the retroreflectors 1402 on the HMD 102, it is possible to determine (e.g. by the computing device 106) and track the location and/or orientation of the HMD 102 relative to the emitter/detector unit 1402 and in the local environment.

In some implementations, the retroreflectors 1402 on the HMD 102 can be modulating retroreflectors. As previously described, such modulating retroreflectors are configured to modulate the incoming scanning beam so that the reflected scanning beam is encoded with a unique identifying code that enables identification of the given retroreflector that reflected the scanning beam. In the illustrated implementation, the detector of the emitter/detector unit 1402 and/or the computing device 106 can be configured to process the reflected scanning beam that has been detected to identify the code if present, and determine which retroreflector of the HMD 102 produced the reflected scanning beam. By being able to identify the specific retroreflector that reflected the scanning beam at a given time with certainty (and directly based on the reflected scanning beam alone), the spatial tracking of the HMD 102 can be performed more easily and more robustly.

Additionally, it will be appreciated that other interface objects such as controller device 104 can be configured to have retroreflectors disposed thereon. And using such retroreflectors, the locations and/or orientations of these interface objects can be determined and tracked in a manner similar to that described for the HMD 102.

Figure 14B:
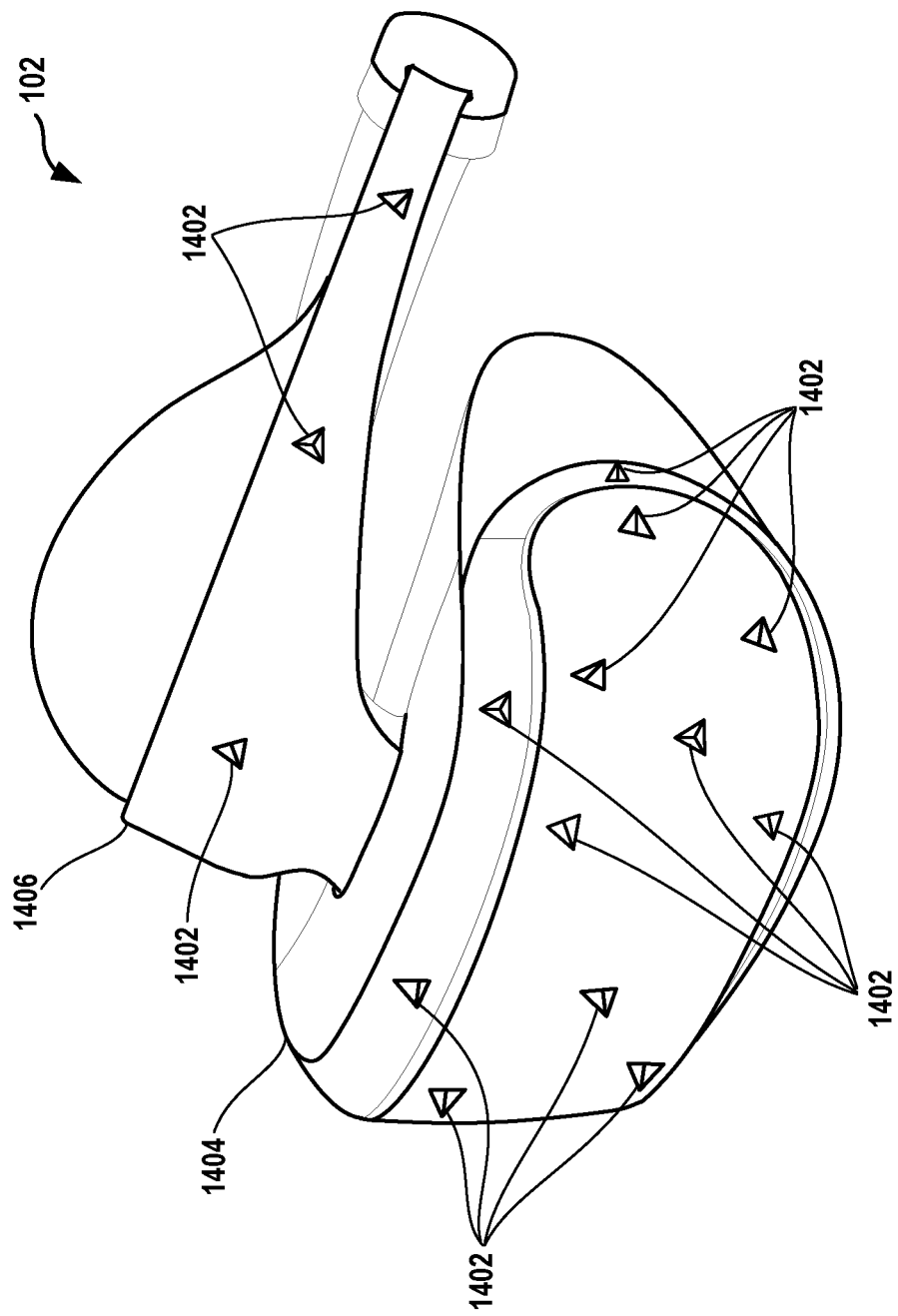
FIG. 14B illustrates a head-mounted display having a plurality of retroreflectors, in accordance with implementations of the disclosure.

FIG. 14B illustrates a head-mounted display having a plurality of retroreflectors, in accordance with implementations of the disclosure. In the illustrated implementation, the HMD 102 includes a plurality of retroreflectors that are distributed throughout the HMD 102. Multiple retroreflectors are positioned along the housing of the viewing/display portion 1404 of the HMD 102 as well as along the headband portion 1406 of the HMD 102. It will be appreciated that in some implementations, the retroreflectors 1402 can be modulating retroreflectors.

With continued reference to FIG. 14A, though a single emitter/detector unit 1402 is shown in the illustrated implementation, it should be appreciated that in some implementations, there are more than one emitter/detector units positioned in the local environment.

Figure 14C:
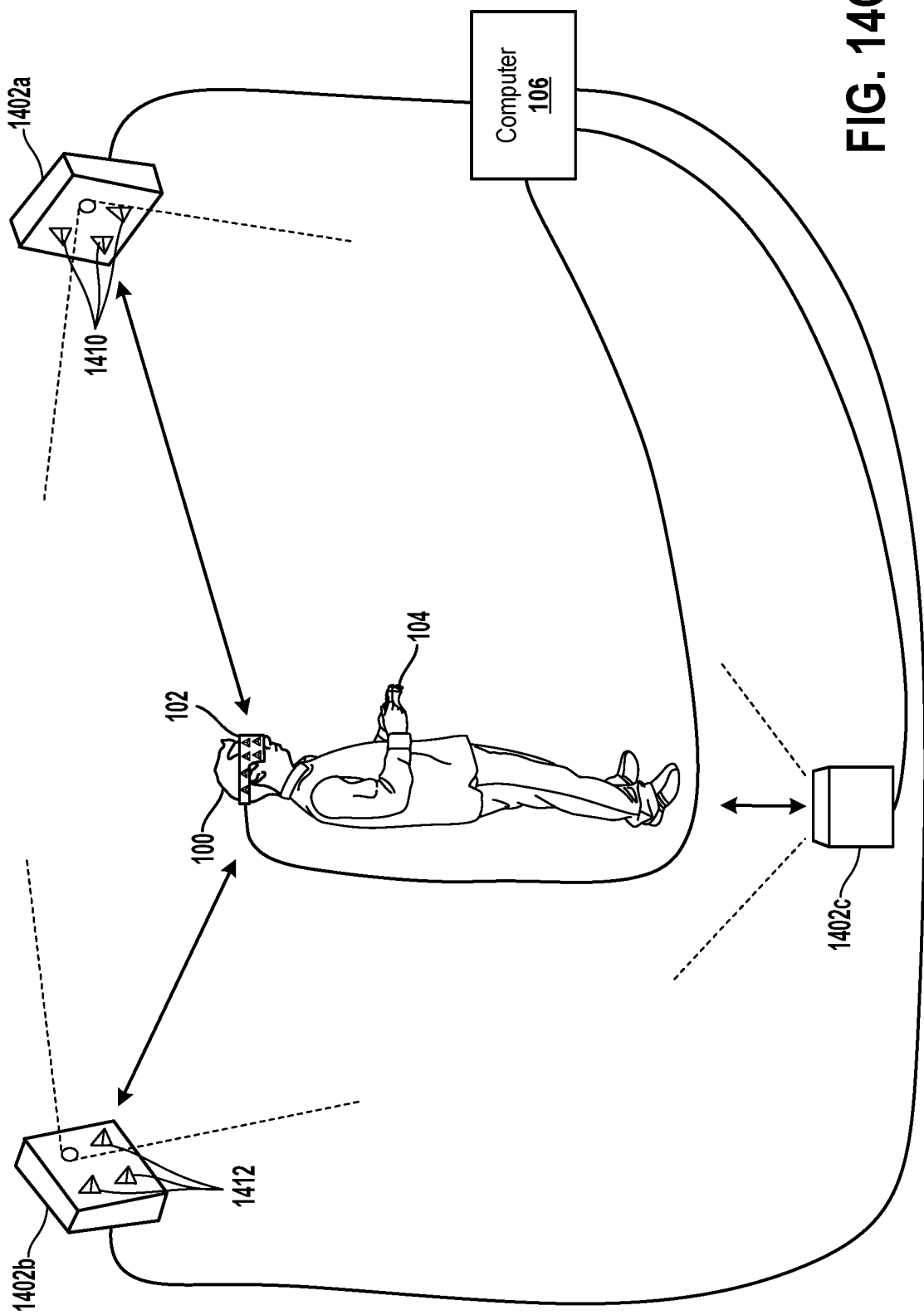
FIG. 14C illustrates a system wherein multiple emitter/detector units are used to track an HMD having retroreflectors, in accordance with implementations of the disclosure.

FIG. 14C illustrates a system wherein multiple emitter/detector units are used to track an HMD having retroreflectors, in accordance with implementations of the disclosure. By utilizing additional emitter/detector units that are positioned at different locations in the local environment, the HMD 102 can be tracked simultaneously from different perspectives, and so its location/orientation can be determined with greater fidelity. In the illustrated implementation, there are emitter/detector units 1402a, 1402b, and 1402c positioned in the local environment surrounding the user 100 and HMD 102. Each emitter/detector unit functions in a manner in accordance with that previously described, emitting a scanning beam that traces a predefined scan pattern, and detecting reflected beams from the retroreflectors on the HMD 102.

It will be appreciated that when the retroreflectors of the HMD are not modulating retroreflectors, then a reflected beam is very similar to an emitted scanning beam by any of the emitter/detector units (that has not been reflected). Therefore, it is desirable in such a configuration for the emitter/detector units to be positioned so that they do not emit scanning beams towards each other.

However, in a configuration wherein the retroreflectors of the HMD are modulating retroreflectors, then even if a given emitter/detector unit receives an unreflected beam hit directly from another emitter/detector unit, the detected beam can be readily distinguished from reflected beam hits, as it will not be modulated/encoded since it was not reflected by one of the modulating retroreflectors. This can enable more flexible positioning of the emitter/detector units in systems employing multiple ones of the emitter/detector units.

In further implementations, the emitter/detector units may themselves include one or more retroreflectors, which may also be modulating retroreflectors in some implementations. For example, in the illustrated implementation, the emitter/detector unit 1402a is shown to include retroreflectors 1410, and the emitter/detector unit 1402b is shown to include retroreflectors 1412. By including retroreflectors on the emitter/detector units, then the emitter/detector units may be capable of detecting each other, and their positions and orientations in the local environment relative to each other can be determined (e.g. by the computer 106). It will be appreciated that the principles for this are similar to those already described for tracking the HMD 102. It is noted that in this manner, the system can be self-calibrated, such that the locations and orientations of the emitter/detector units relative to each other in the local environment can be determined without requiring user action, provided the emitter/detector units are placed within the coverage region of each other's emitted scan patterns.

Figures 1, 15A:
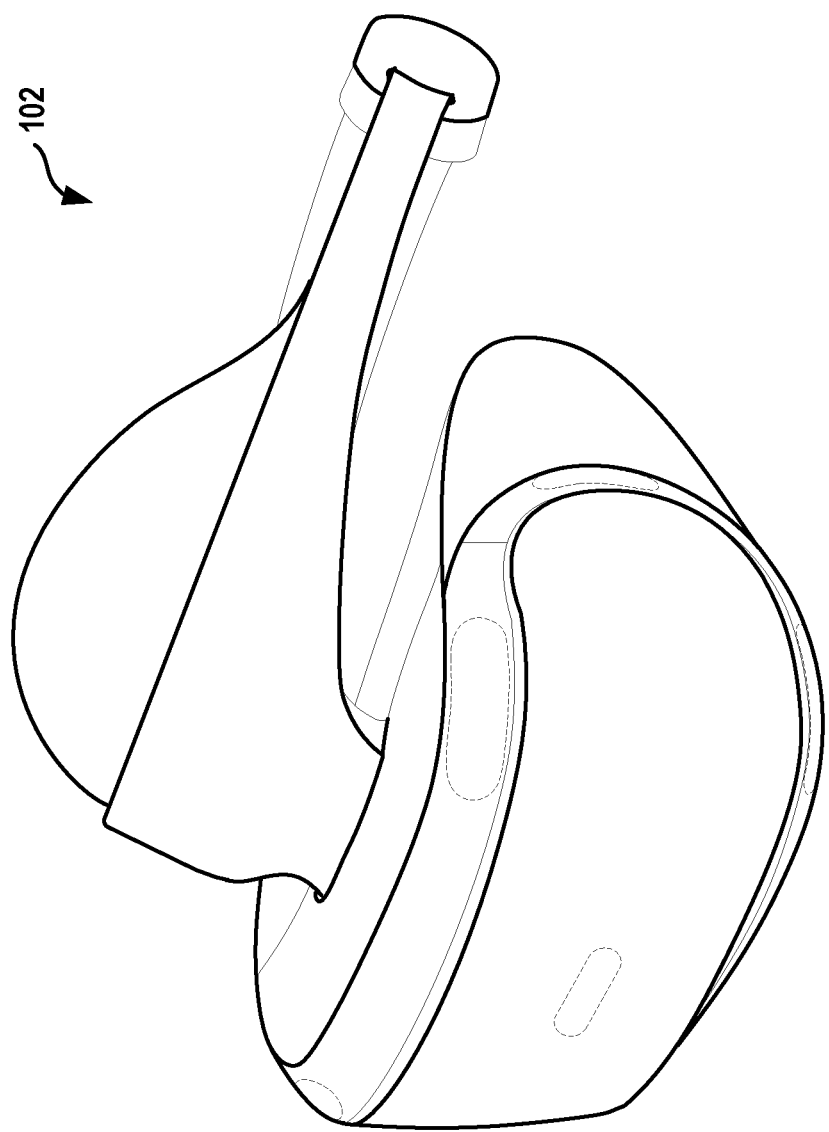
Figures 2, 15A:
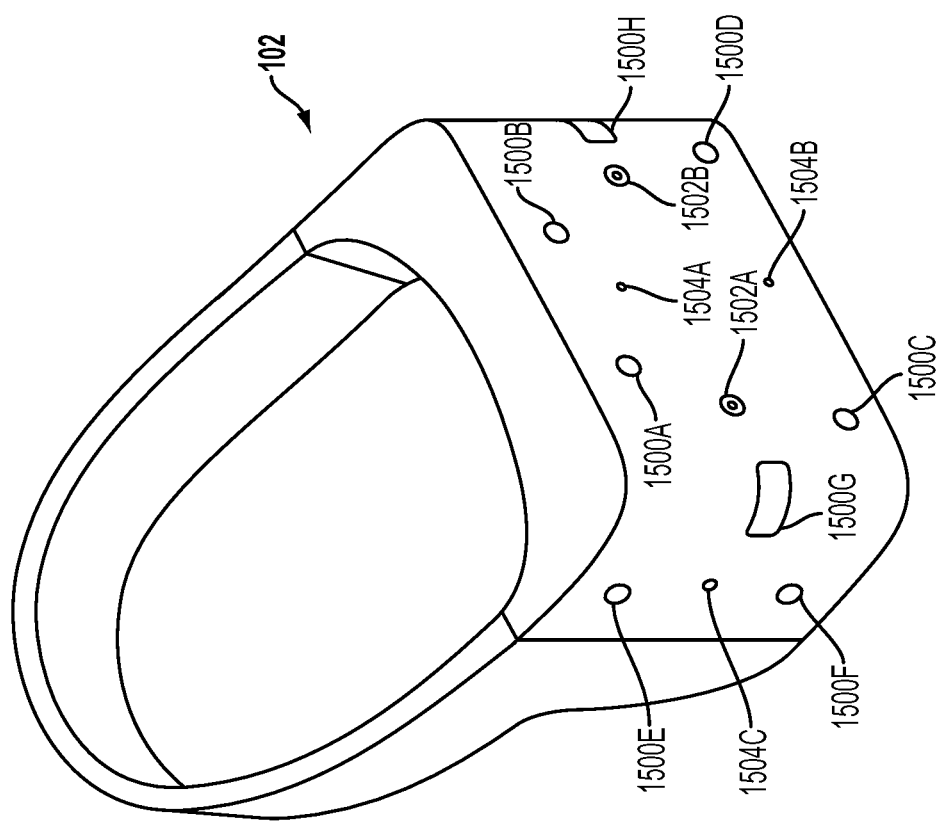

FIGS. 15A-1 and 15A-2 illustrate a head-mounted display (HMD), in accordance with an embodiment of the disclosure. FIG. 15A-1 in particular illustrates the Playstation® VR headset, which is one example of a HMD in accordance with implementations of the disclosure. As shown, the HMD 102 includes a plurality of lights 1500A-H. Each of these lights may be configured to have specific shapes, and can be configured to have the same or different colors. The lights 1500A, 1500B, 1500C, and 1500D are arranged on the front surface of the HMD 102. The lights 1500E and 1500F are arranged on a side surface of the HMD 102. And the lights 1500G and 1500H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 1500G and 1500H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 1504A and 1504B defined on the front surface of the HMD 102, and microphone 1504C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 1502A and 1502B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 1502A and 1502B (e.g., or one or more front facing cameras 1208' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 15B:
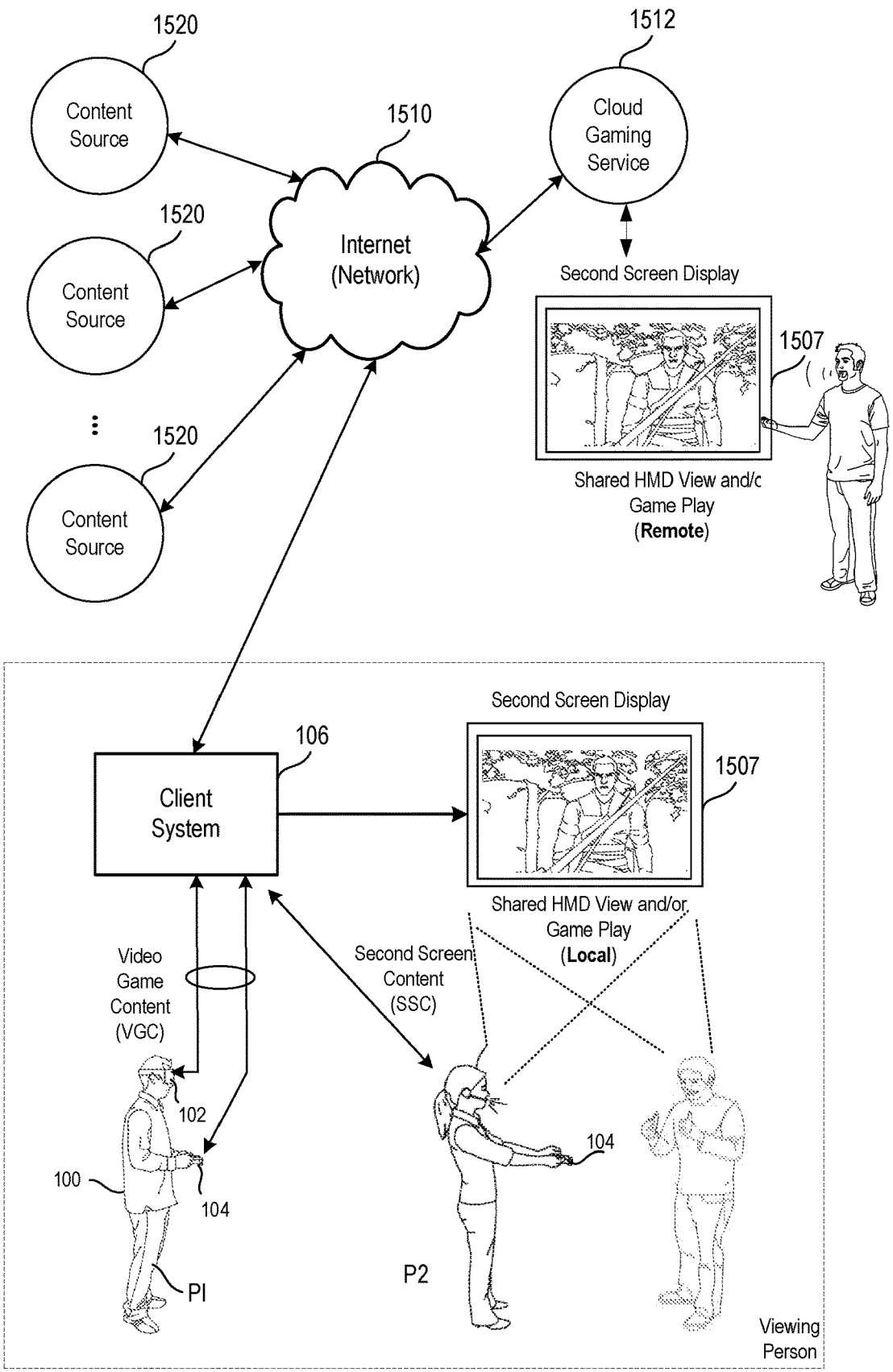
FIG. 15B illustrates one example of an HMD user interfacing with a client system, and the client system providing content to a second screen display, which is referred to as a second screen, in accordance with one embodiment.

FIG. 15B illustrates one example of an HMD 102 user 100 interfacing with a client system 106, and the client system 106 providing content to a second screen display, which is referred to as a second screen 1507. The client system 106 may include integrated electronics for processing the sharing of content from the HMD 102 to the second screen 1507. Other embodiments may include a separate device, module, connector, that will interface between the client system and each of the HMD 102 and the second screen 1507. In this general example, user 100 is wearing HMD 102 and is playing a video game using a controller, which may also be directional interface object 104. The interactive play by user 100 will produce video game content (VGC), which is displayed interactively to the HMD 102.

In one embodiment, the content being displayed in the HMD 102 is shared to the second screen 1507. In one example, a person viewing the second screen 1507 can view the content being played interactively in the HMD 102 by user 100. In another embodiment, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 1507 along with the VGC received from the HMD 102.

Accordingly, the interactivity by other users who may be co-located or remote from an HMD user can be social, interactive, and more immersive to both the HMD user and users that may be viewing the content played by the HMD user on a second screen 1507. As illustrated, the client system 106 can be connected to the Internet 1510. The Internet can also provide access to the client system 106 to content from various content sources 1520. The content sources 1520 can include any type of content that is accessible over the Internet.

Such content, without limitation, can include video content, movie content, streaming content, social media content, news content, friend content, advertisement content, etc. In one embodiment, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one embodiment receive the second screen content from one of the content sources 1520, or from a local user, or a remote user.

Figure 16:
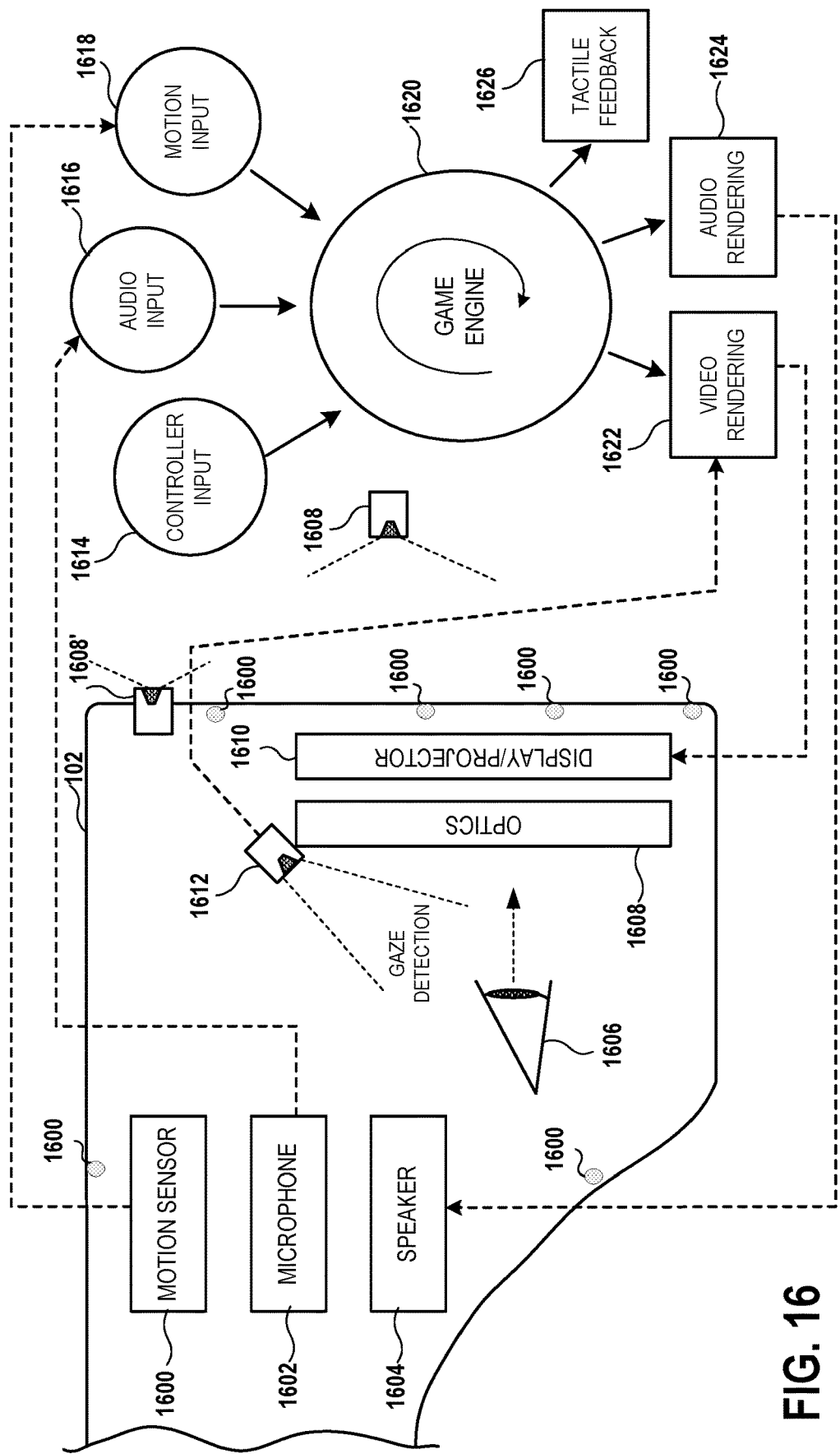
FIG. 16 conceptually illustrates the function of an HMD in conjunction with an executing video game, in accordance with an embodiment of the disclosure.

FIG. 16 conceptually illustrates the function of the HMD 102 in conjunction with an executing video game, in accordance with an embodiment of the disclosure. The executing video game is defined by a game engine 1620 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 1614, audio input 1616 and motion input 1618. The controller input 1614 may be defined from the operation of a gaming controller separate from the HMD 102, such as a handheld gaming controller (e.g. Sony DUALSHOCK®4 wireless controller, Sony PlayStation®Move motion controller) or directional interface object 104. By way of example, controller input 1614 may include directional inputs, button presses, trigger activation, movements, gestures, or other kinds of inputs processed from the operation of a gaming controller. The audio input 1616 can be processed from a microphone 1602 of the HMD 102, or from a microphone included in the image capture device 1608 or elsewhere in the local environment. The motion input 1618 can be processed from a motion sensor 1600 included in the HMD 102, or from image capture device 1608 as it captures images of the HMD 102. The game engine 1620 receives inputs which are processed according to the configuration of the game engine to update the game state of the video game. The game engine 1620 outputs game state data to various rendering modules which process the game state data to define content which will be presented to the user.

In the illustrated embodiment, a video rendering module 1622 is defined to render a video stream for presentation on the HMD 102. The video stream may be presented by a display/projector mechanism 1610, and viewed through optics 1608 by the eye 1606 of the user. An audio rendering module 1604 is configured to render an audio stream for listening by the user. In one embodiment, the audio stream is output through a speaker 1604 associated with the HMD 102. It should be appreciated that speaker 1604 may take the form of an open air speaker, headphones, or any other kind of speaker capable of presenting audio.

In one embodiment, a gaze tracking camera 1612 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 1612, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 1626 is configured to provide signals to tactile feedback hardware included in either the HMD 102 or another device operated by the user, such as directional interface object 104. The tactile feedback may take the form of various kinds of tactile sensations, such as vibration feedback, temperature feedback, pressure feedback, etc. The directional interface object 104 can include corresponding hardware for rendering such forms of tactile feedback.

Figure 17:
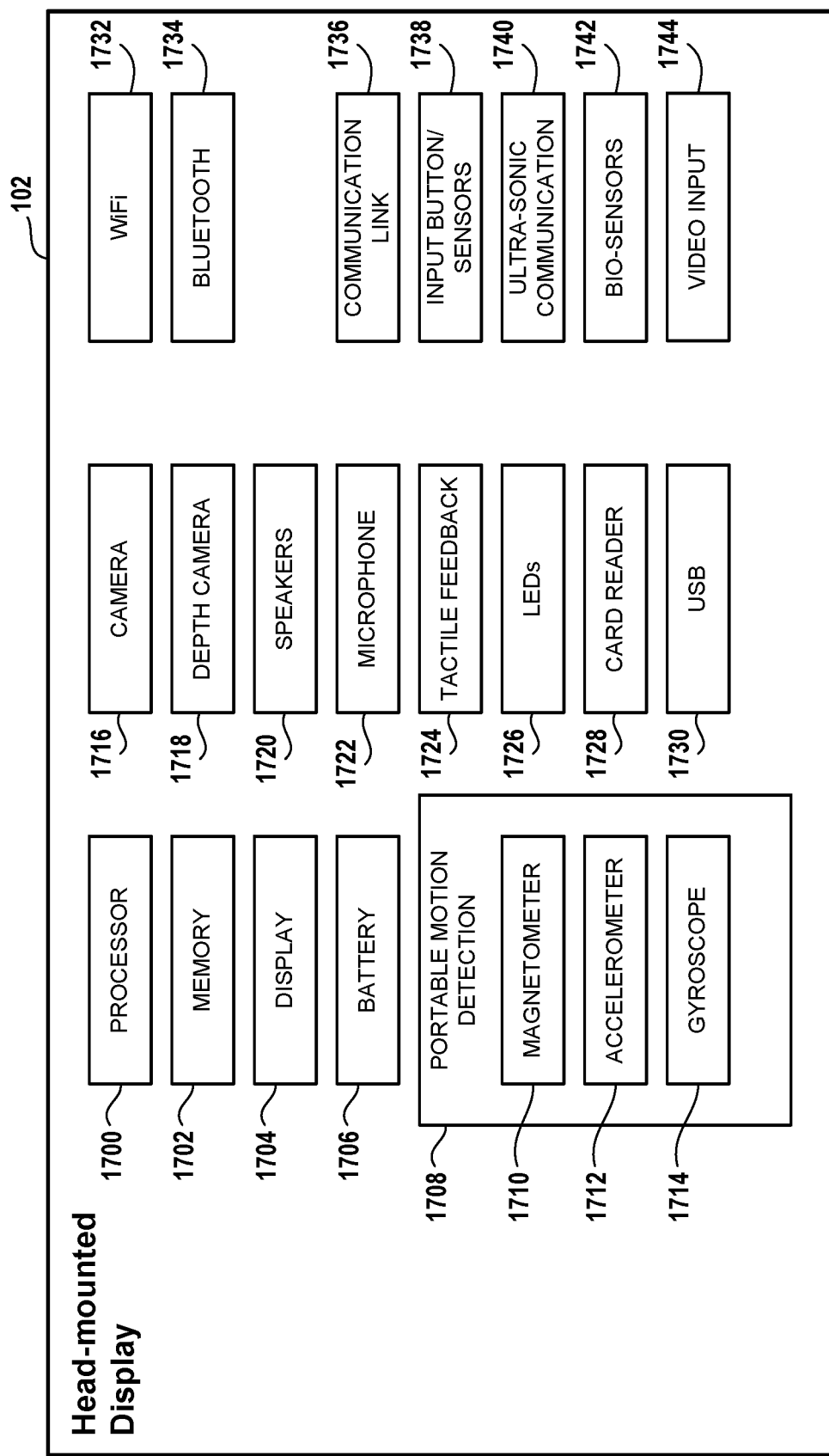
FIG. 17 illustrates components of a head-mounted display, in accordance with an embodiment of the disclosure.

With reference to FIG. 17, a diagram illustrating components of a head-mounted display 102 is shown, in accordance with an embodiment of the disclosure. The head-mounted display 102 includes a processor 1700 for executing program instructions. A memory 1702 is provided for storage purposes, and may include both volatile and non-volatile memory. A display 1704 is included which provides a visual interface that a user may view. A battery 1706 is provided as a power source for the head-mounted display 102. A motion detection module 1708 may include any of various kinds of motion sensitive hardware, such as a magnetometer 1710, an accelerometer 1712, and a gyroscope 1714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1710 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1712 is used together with magnetometer 1710 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1716 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1718 may be included in the head-mounted display 102 for sensing depth information of objects in a real environment.

The head-mounted display 102 includes speakers 1720 for providing audio output. Also, a microphone 1722 may be included for capturing audio from the real environment, including sounds from the ambient environment, speech made by the user, etc. The head-mounted display 102 includes tactile feedback module 1724 for providing tactile feedback to the user. In one embodiment, the tactile feedback module 1724 is capable of causing movement and/or vibration of the head-mounted display 102 so as to provide tactile feedback to the user.

LEDs 1726 are provided as visual indicators of statuses of the head-mounted display 102. For example, an LED may indicate battery level, power on, etc. A card reader 1728 is provided to enable the head-mounted display 102 to read and write information to and from a memory card. A USB interface 1730 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1732 is included for enabling connection to the Internet or a local area network via wireless networking technologies. Also, the head-mounted display 102 includes a Bluetooth module 1734 for enabling wireless connection to other devices. A communications link 1736 may also be included for connection to other devices. In one embodiment, the communications link 1736 utilizes infrared transmission for wireless communication. In other embodiments, the communications link 1736 may utilize any of various wireless or wired transmission protocols for communication with other devices.

Input buttons/sensors 1738 are included to provide an input interface for the user. Any of various kinds of input interfaces may be included, such as buttons, touchpad, joystick, trackball, etc. An ultra-sonic communication module 1740 may be included in head-mounted display 102 for facilitating communication with other devices via ultra-sonic technologies.

Bio-sensors 1742 are included to enable detection of physiological data from a user. In one embodiment, the bio-sensors 1742 include one or more dry electrodes for detecting bio-electric signals of the user through the user's skin.

A video input 1744 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 18:
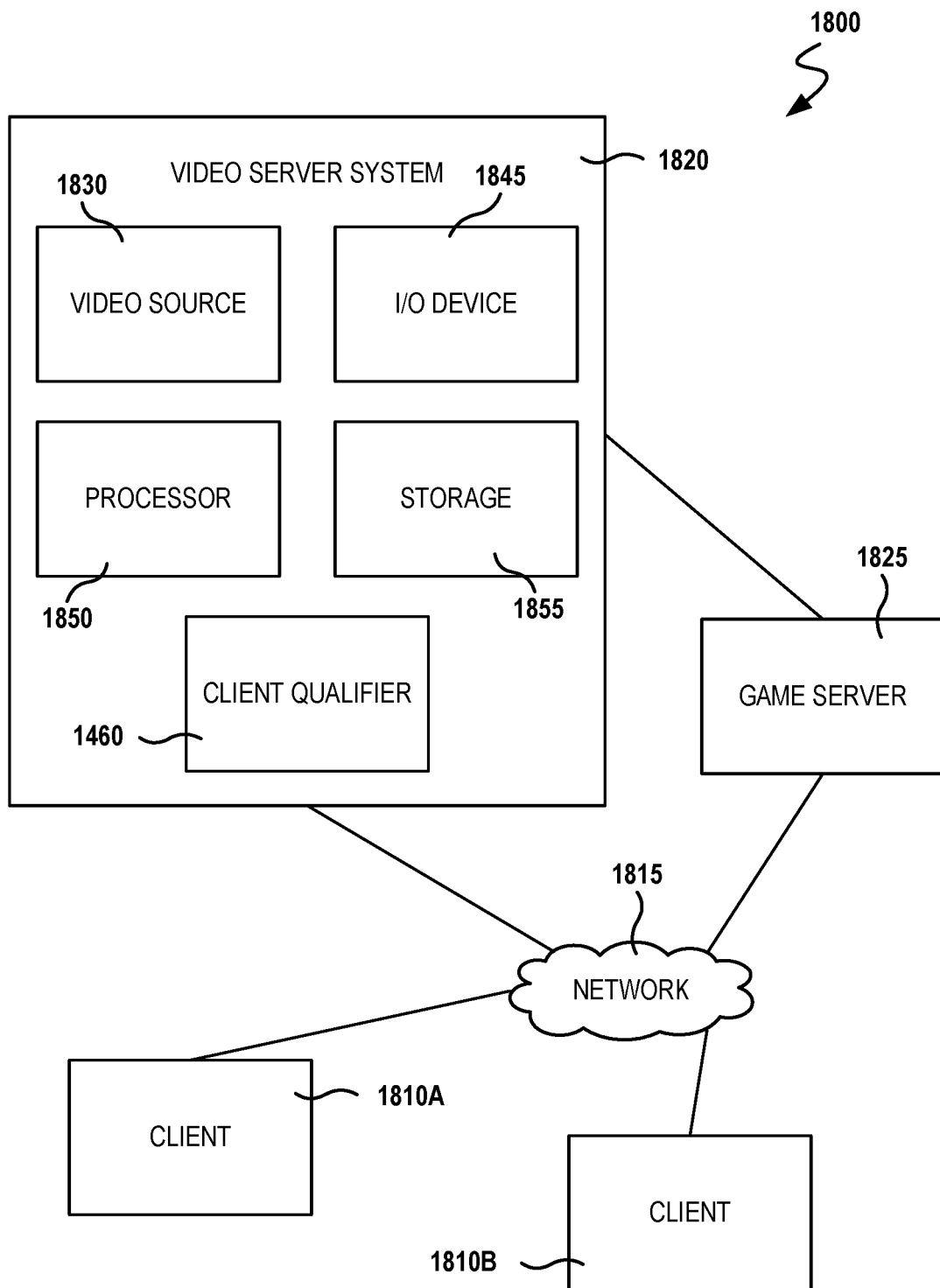
FIG. 18 is a block diagram of a Game System 1400, according to various embodiments of the disclosure.

FIG. 18 is a block diagram of a Game System 1800, according to various embodiments of the disclosure. Game System 1800 is configured to provide a video stream to one or more Clients 1810 via a Network 1815. Game System 1800 typically includes a Video Server System 1820 and an optional game server 1825. Video Server System 1820 is configured to provide the video stream to the one or more Clients 1810 with a minimal quality of service. For example, Video Server System 1820 may receive a game command that changes the state of or a point of view within a video game, and provide Clients 1810 with an updated video stream reflecting this change in state with minimal lag time. The Video Server System 1820 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1810, referred to herein individually as 1810A, 1810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1810 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1810 or on a separate device such as a monitor or television. Clients 1810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1810 are optionally geographically dispersed. The number of clients included in Game System 1800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1820 to deliver a game viewed through the HMD. In one embodiment, the game console receives the video stream from the video server system 1820, and the game console forwards the video stream, or updates to the video stream, to the HMD for rendering.

Clients 1810 are configured to receive video streams via Network 1815. Network 1815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1810 may, but are not required to, further include systems configured for modifying received video. For example, a Client may be configured to perform further rendering, to overlay one video image on another video image, to crop a video image, and/or the like. For example, Clients 1810 may be configured to receive various types of video frames, such as I-frames, P-frames and B-frames, and to process these frames into images for display to a user. In some embodiments, a member of Clients 1810 is configured to perform further rendering, shading, conversion to 3-D, or like operations on the video stream. A member of Clients 1810 is optionally configured to receive more than one audio or video stream. Input devices of Clients 1810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1810 is generated and provided by Video Server System 1820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1810 are typically configured to receive inputs from a user. These inputs may include game commands configured to change the state of the video game or otherwise affect game play. The game commands can be received using input devices and/or may be automatically generated by computing instructions executing on Clients 1810. The received game commands are communicated from Clients 1810 via Network 1815 to Video Server System 1820 and/or Game Server 1825. For example, in some embodiments, the game commands are communicated to Game Server 1825 via Video Server System 1820. In some embodiments, separate copies of the game commands are communicated from Clients 1810 to Game Server 1825 and Video Server System 1820. The communication of game commands is optionally dependent on the identity of the command Game commands are optionally communicated from Client 1810A through a different route or communication channel that that used to provide audio or video streams to Client 1810A.

Game Server 1825 is optionally operated by a different entity than Video Server System 1820. For example, Game Server 1825 may be operated by the publisher of a multiplayer game. In this example, Video Server System 1820 is optionally viewed as a client by Game Server 1825 and optionally configured to appear from the point of view of Game Server 1825 to be a prior art client executing a prior art game engine. Communication between Video Server System 1820 and Game Server 1825 optionally occurs via Network 1815. As such, Game Server 1825 can be a prior art multiplayer game server that sends game state information to multiple clients, one of which is game server system 1820. Video Server System 1820 may be configured to communicate with multiple instances of Game Server 1825 at the same time. For example, Video Server System 1820 can be configured to provide a plurality of different video games to different users. Each of these different video games may be supported by a different Game Server 1825 and/or published by different entities. In some embodiments, several geographically distributed instances of Video Server System 1820 are configured to provide game video to a plurality of different users. Each of these instances of Video Server System 1820 may be in communication with the same instance of Game Server 1825. Communication between Video Server System 1820 and one or more Game Server 1825 optionally occurs via a dedicated communication channel. For example, Video Server System 1820 may be connected to Game Server 1825 via a high bandwidth channel that is dedicated to communication between these two systems.

Video Server System 1820 comprises at least a Video Source 1830, an I/O Device 1845, a Processor 1850, and non-transitory Storage 1855. Video Server System 1820 may include one computing device or be distributed among a plurality of computing devices. These computing devices are optionally connected via a communications system such as a local area network.

Video Source 1830 is configured to provide a video stream, e.g., streaming video or a series of video frames that form a moving picture. In some embodiments, Video Source 1830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1825. Game Server 1825 may maintain a copy of the state of the game based on game commands received from multiple players using geographically disperse clients. In these cases, the game state is provided by Game Server 1825 to Video Source 1830, wherein a copy of the game state is stored and rendering is performed. Game Server 1825 may receive game commands directly from Clients 1810 via Network 1815, and/or may receive game commands via Video Server System 1820.

Video Source 1830 typically includes rendering logic, e.g., hardware, firmware, and/or software stored on a computer readable medium such as Storage 1855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1830 includes a video recording device such as a camera. This camera may be used to generate delayed or live video that can be included in the video stream of a computer game. The resulting video stream optionally includes both rendered images and images recorded using a still or video camera. Video Source 1830 may also include storage devices configured to store previously recorded video to be included in a video stream. Video Source 1830 may also include motion or positioning sensing devices configured to detect motion or position of an object, e.g., person, and logic configured to determine a game state or produce video-based on the detected motion and/or position.

Video Source 1830 is optionally configured to provide overlays configured to be placed on other video. For example, these overlays may include a command interface, log in instructions, messages to a game player, images of other game players, video feeds of other game players (e.g., webcam video). In embodiments of Client 1810A including a touch screen interface or a gaze detection interface, the overlay may include a virtual keyboard, joystick, touch pad, and/or the like. In one example of an overlay a player's voice is overlaid on an audio stream. Video Source 1830 optionally further includes one or more audio sources.

In embodiments wherein Video Server System 1820 is configured to maintain the game state based on input from more than one player, each player may have a different point of view comprising a position and direction of view. Video Source 1830 is optionally configured to provide a separate video stream for each player based on their point of view. Further, Video Source 1830 may be configured to provide a different frame size, frame data size, and/or encoding to each of Client 1810. Video Source 1830 is optionally configured to provide 3-D video.

I/O Device 1845 is configured for Video Server System 1820 to send and/or receive information such as video, commands, requests for information, a game state, gaze information, device motion, device location, user motion, client identities, player identities, game commands, security information, audio, and/or the like. I/O Device 1845 typically includes communication hardware such as a network card or modem. I/O Device 1845 is configured to communicate with Game Server 1825, Network 1815, and/or Clients 1810.

Processor 1850 is configured to execute logic, e.g. software, included within the various components of Video Server System 1820 discussed herein. For example, Processor 1850 may be programmed with software instructions in order to perform the functions of Video Source 1830, Game Server 1825, and/or a Client Qualifier 1860. Video Server System 1820 optionally includes more than one instance of Processor 1850. Processor 1850 may also be programmed with software instructions in order to execute commands received by Video Server System 1820, or to coordinate the operation of the various elements of Game System 1800 discussed herein. Processor 1850 may include one or more hardware device. Processor 1850 is an electronic processor.

Storage 1855 includes non-transitory analog and/or digital storage devices. For example, Storage 1855 may include an analog storage device configured to store video frames. Storage 1855 may include a computer readable digital storage, e.g. a hard drive, an optical drive, or solid state storage. Storage 1815 is configured (e.g. by way of an appropriate data structure or file system) to store video frames, artificial frames, a video stream including both video frames and artificial frames, audio frame, an audio stream, and/or the like. Storage 1855 is optionally distributed among a plurality of devices. In some embodiments, Storage 1855 is configured to store the software components of Video Source 1830 discussed elsewhere herein. These components may be stored in a format ready to be provisioned when needed.

Video Server System 1820 optionally further comprises Client Qualifier 1860. Client Qualifier 1860 is configured for remotely determining the capabilities of a client, such as Clients 1810A or 1810B. These capabilities can include both the capabilities of Client 1810A itself as well as the capabilities of one or more communication channels between Client 1810A and Video Server System 1820. For example, Client Qualifier 1860 may be configured to test a communication channel through Network 1815.

Client Qualifier 1860 can determine (e.g., discover) the capabilities of Client 1810A manually or automatically. Manual determination includes communicating with a user of Client 1810A and asking the user to provide capabilities. For example, in some embodiments, Client Qualifier 1860 is configured to display images, text, and/or the like within a browser of Client 1810A. In one embodiment, Client 1810A is an HMD that includes a browser. In another embodiment, client 1810A is a game console having a browser, which may be displayed on the HMD. The displayed objects request that the user enter information such as operating system, processor, video decoder type, type of network connection, display resolution, etc. of Client 1810A. The information entered by the user is communicated back to Client Qualifier 1860.

Automatic determination may occur, for example, by execution of an agent on Client 1810A and/or by sending test video to Client 1810A. The agent may comprise computing instructions, such as java script, embedded in a web page or installed as an add-on. The agent is optionally provided by Client Qualifier 1860. In various embodiments, the agent can find out processing power of Client 1810A, decoding and display capabilities of Client 1810A, lag time reliability and bandwidth of communication channels between Client 1810A and Video Server System 1820, a display type of Client 1810A, firewalls present on Client 1810A, hardware of Client 1810A, software executing on Client 1810A, registry entries within Client 1810A, and/or the like.

Client Qualifier 1860 includes hardware, firmware, and/or software stored on a computer readable medium. Client Qualifier 1860 is optionally disposed on a computing device separate from one or more other elements of Video Server System 1820. For example, in some embodiments, Client Qualifier 1860 is configured to determine the characteristics of communication channels between Clients 1810 and more than one instance of Video Server System 1820. In these embodiments the information discovered by Client Qualifier can be used to determine which instance of Video Server System 1820 is best suited for delivery of streaming video to one of Clients 1810.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A head-mounted display (HMD), comprising:
   an emitter configured to emit a scanning beam into an interactive environment in which the HMD is disposed, the scanning beam being configured to continuously trace a predefined scan pattern;
   a detector configured to detect reflections of the scanning beam back to the HMD by each of a plurality of modulating retroreflectors that cycle between transmissive and non-transmissive in a pattern;
   a processor configured to, for each detected reflection of the scanning beam, analyze the detected reflection of the scanning beam to identify the modulating retroreflector that produced the reflection of the scanning beam, and further determine a time at which the reflection of the scanning beam by the identified modulating retroreflector occurred, wherein the times at which the reflections occurred and the identification of the modulating retroreflectors that produced the reflections are used to determine a location or orientation of the HMD in the interactive environment;
   a display device configured to render a view of a virtual space that is determined based on the determined location or orientation of the HMD.

2. The HMD of claim 1, wherein analyzing the detected reflection of the scanning beam includes identifying an encoding of the reflection of the scanning beam that is produced by, and correlated to, the modulating retroreflector that produced the reflection.

3. The HMD of claim 1, wherein the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

4. The HMD of claim 3, wherein the predefined scan pattern is defined by a raster scan pattern or a Lissajous scan pattern.

5. The HMD of claim 3, wherein the scanning beam is defined by an infrared (IR) beam that is generated by the beam generator.

6. The HMD of claim 1, wherein each of the plurality of modulating retroreflectors is configured to reflect the scanning beam back to the HMD along a return path that is substantially parallel and substantially coincident to an emission path along which the scanning beam was emitted from the emitter.

7. The HMD of claim 6, wherein each of the plurality of modulating retroreflectors includes a corner reflector.

8. The HMD of claim 1, wherein the detector includes at least one photosensor configured to detect the reflections of the scanning beam.

9. The HMD of claim 1, wherein the plurality of modulating retroreflectors includes three or more modulating retroreflectors.

10. The HMD of claim 1, wherein determining the location or orientation of the HMD includes, for each modulating retroreflector, determining a position of the scanning beam at the time that the reflection of the scanning beam from the modulating retroreflector occurred.

11. A system, comprising:
    a plurality of modulating retroreflectors;
    a head-mounted display (HMD), including,
    an emitter configured to emit a scanning beam into an interactive environment in which the HMD is disposed, the scanning beam being configured to continuously trace a predefined scan pattern;
    a detector configured to detect reflections of the scanning beam back to the HMD by each of the plurality of modulating retroreflectors that cycle between transmissive and non-transmissive in a pattern;
    a processor configured to, for each detected reflection of the scanning beam, analyze the detected reflection of the scanning beam to identify the modulating retroreflector that produced the reflection of the scanning beam, and further determine a time at which the reflection of the scanning beam by the identified modulating retroreflector occurred, wherein the times at which the reflections occurred and the identification of the modulating retroreflectors that produced the reflections are used to determine a location or orientation of the HMD in the interactive environment;
    a display device;
    a computing device, the computing device configured to generate a view of a virtual space that is determined based on the determined location or orientation of the HMD in the interactive environment;
    wherein the display device of the HMD is configured to render the view of the virtual space.

12. The system of claim 11, wherein analyzing the detected reflection of the scanning beam includes identifying an encoding of the reflection of the scanning beam that is produced by, and correlated to, the modulating retroreflector that produced the reflection.

13. The system of claim 11, wherein the emitter includes a beam generator and a microelectromechanical system (MEMS) mirror, the beam generator configured to generate and direct the scanning beam towards the MEMS mirror, wherein the MEMS mirror is controlled to steer the scanning beam to continuously trace the predefined scan pattern.

14. The system of claim 11, wherein each of the plurality of modulating retroreflectors is configured to reflect the scanning beam back to the HMD along a return path that is substantially parallel and substantially coincident to an emission path along which the scanning beam was emitted from the emitter.

15. The system of claim 14, wherein each of the plurality of modulating retroreflectors includes a corner reflector.

16. The system of claim 11, wherein the detector includes at least one photosensor configured to detect the reflections of the scanning beam.

17. The system of claim 11, wherein the plurality of modulating retroreflectors includes three or more modulating retroreflectors.

18. The system of claim 10, wherein determining the location or orientation of the HMD includes, for each modulating retroreflector, determining a position of the scanning beam at the time that the reflection of the scanning beam from the modulating retroreflector occurred.

19. The system of claim 1, wherein each of the plurality of modulating retroreflectors cycles between transmissive and non-transmissive as controlled by an electronic signal.

20. The system of claim 11, wherein each of the plurality of modulating retroreflectors cycles between transmissive and non-transmissive as controlled by an electronic signal.

* * * * *